(12) United States Patent
Kim et al.

(10) Patent No.: US 12,443,268 B2
(45) Date of Patent: Oct. 14, 2025

(54) ELECTRONIC APPARATUS FOR PROVIDING SCREEN IN POSTURE OPTIMIZED FOR USER AND CONTROL METHOD THEREOF

(71) Applicant: SAMSUNG ELECTRONICS CO., LTD., Suwon-si (KR)

(72) Inventors: Miyoung Kim, Suwon-si (KR); Taehyeong Kim, Suwon-si (KR); Hyelim Park, Suwon-si (KR); Joonah Park, Suwon-si (KR); Changseob Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/226,053

(22) Filed: Jul. 25, 2023

(65) Prior Publication Data

US 2024/0094803 A1    Mar. 21, 2024

Related U.S. Application Data

(63) Continuation of application No. PCT/KR2023/008415, filed on Jun. 19, 2023.

(30) Foreign Application Priority Data

Sep. 15, 2022 (KR) .................. 10-2022-0116651
Jan. 12, 2023 (KR) .................. 10-2023-0004884

(51) Int. Cl.
*G06F 3/01* (2006.01)
*G06F 3/16* (2006.01)
(Continued)

(52) U.S. Cl.
CPC ............. *G06F 3/011* (2013.01); *G06F 3/017* (2013.01); *G06F 3/167* (2013.01); *G06T 7/50* (2017.01);
(Continued)

(58) Field of Classification Search
CPC .......... G06F 3/011; G06F 3/017; G06F 3/167; G06T 7/50; G06T 7/70; G06T 2200/24;
(Continued)

(56) References Cited

U.S. PATENT DOCUMENTS 9,298,254 B2  3/2016  Ha et al.
9,413,875 B2  8/2016  Jang et al.
(Continued)

FOREIGN PATENT DOCUMENTS

CN    101470446 A    7/2009
CN    104122985 A    10/2014
(Continued)

OTHER PUBLICATIONS

International Search Report dated Oct. 5, 2023 issued by the International Searching Authority in International Application No. PCT/KR2023/008415 (PCT/ISA/210).
(Continued)

*Primary Examiner* — Bryan Earles
(74) *Attorney, Agent, or Firm* — Sughrue Mion, PLLC

(57) ABSTRACT

An electronic apparatus includes a camera, a driver, a display, and at least one processor operatively connected to the camera, the driver, and the display. The processor is configured to control the camera to capture an image, identify a user posture included in the captured image, identify at least one parameter among a plurality of parameters related to a user based on the user posture, and control the driver to change a position of the electronic apparatus based on the at least one parameter, and change a posture of the display.

20 Claims, 16 Drawing Sheets

(51) Int. Cl.
*G06T 7/20* (2017.01)
*G06T 7/50* (2017.01)
*G06T 7/70* (2017.01)
*H04N 23/62* (2023.01)

(52) U.S. Cl.
CPC ............ *G06T 7/70* (2017.01); *G06T 2200/24* (2013.01); *G06T 2207/20084* (2013.01); *G06T 2207/30196* (2013.01); *H04N 23/62* (2023.01)

(58) Field of Classification Search
CPC ........... G06T 2207/20084; G06T 2207/30196; H04N 23/62
See application file for complete search history.

(56) References Cited

U.S. PATENT DOCUMENTS

| | | | |
|---|---|---|---|
| 10,101,806 B2 | 10/2018 | Hsu et al. | |
| 10,885,319 B2* | 1/2021 | Onuki | G06F 3/0304 |
| 11,341,882 B2 | 5/2022 | Ruy et al. | |
| 11,422,609 B2 | 8/2022 | Na et al. | |
| 11,544,865 B1* | 1/2023 | Kurz | G06T 7/73 |
| 11,740,756 B1* | 8/2023 | Koh | G09B 19/003 |
| | | | 345/520 |
| 2002/0149613 A1 | 10/2002 | Gutta et al. | |
| 2009/0167653 A1 | 7/2009 | Lin | |
| 2009/0319459 A1* | 12/2009 | Breazeal | G06N 3/004 |
| | | | 901/1 |
| 2015/0156308 A1 | 6/2015 | Jang et al. | |
| 2015/0213580 A1* | 7/2015 | Yamano | G09G 3/20 |
| | | | 345/649 |
| 2016/0250754 A1* | 9/2016 | Chang | F16M 11/18 |
| | | | 700/259 |
| 2020/0264684 A1 | 8/2020 | Na et al. | |
| 2020/0380901 A1 | 12/2020 | Ryu et al. | |
| 2021/0312236 A1* | 10/2021 | Goncharov | G06N 20/00 |
| 2022/0092300 A1 | 3/2022 | Eom | |
| 2023/0065758 A1* | 3/2023 | Kwon | F16M 11/28 |
| 2023/0110543 A1 | 4/2023 | Lee et al. | |
| 2023/0166157 A1 | 6/2023 | Kim et al. | |

FOREIGN PATENT DOCUMENTS

| | | |
|---|---|---|
| CN | 108646912 A | 10/2018 |
| CN | 111459284 A | 7/2020 |
| CN | 114581518 A | 6/2022 |
| KR | 10-2015-0062795 A | 6/2015 |
| KR | 10-2020-0101205 A | 8/2020 |
| KR | 10-2020-0136753 A | 12/2020 |
| KR | 10-2021-0065828 A | 6/2021 |
| KR | 10-2022-0039440 A | 3/2022 |
| KR | 10-2022-0051942 A | 4/2022 |
| KR | 10-2415552 B1 | 7/2022 |
| WO | 2021/019540 A1 | 2/2021 |
| WO | 2022/005018 A1 | 1/2022 |

OTHER PUBLICATIONS

Written Opinion dated Oct. 5, 2023 issued by the International Searching Authority in International Application No. PCT/KR2023/008415 (PCT/ISA/237).
Communication dated Jul. 14, 2025, issued by the European Patent Office in European Application No. 23865668.0.

\* cited by examiner

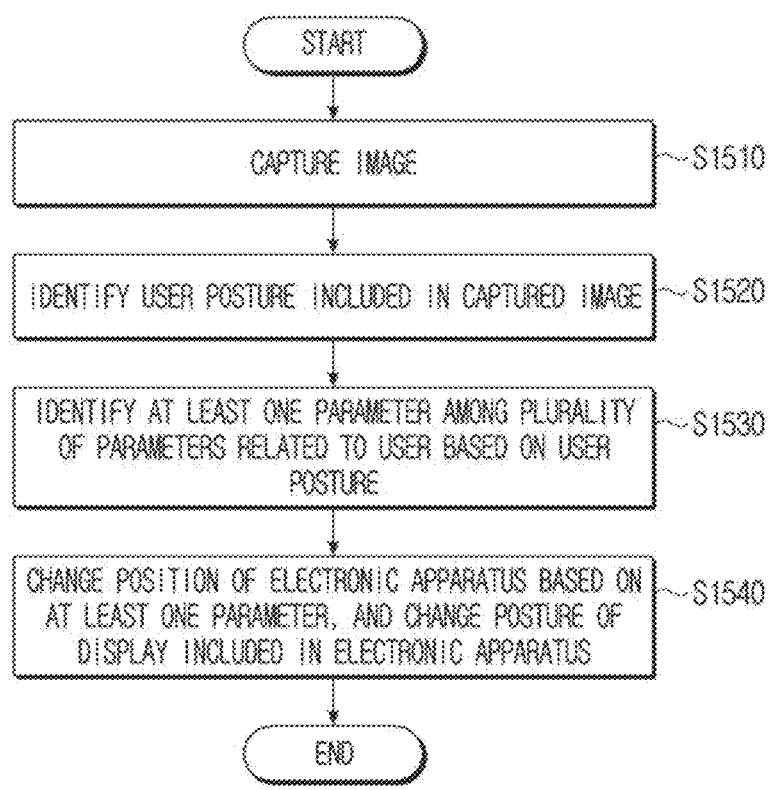

ELECTRONIC APPARATUS FOR PROVIDING SCREEN IN POSTURE OPTIMIZED FOR USER AND CONTROL METHOD THEREOF

CROSS-REFERENCE TO RELATED APPLICATIONS

This application is a bypass continuation of International Application No. PCT/KR2023/008415, filed on Jun. 19, 2023, and claims priority under 35 U.S.C. § 119 to Korean Patent Application No. 10-2022-0116651, filed on Sep. 15, 2022 at the Korean Intellectual Property Office and Korean Patent Application No. 10-2023-0004884, filed on Jan. 12, 2023 at the Korean Intellectual Property Office, the disclosures of which are incorporated by reference herein in their entireties.

BACKGROUND

Field

The disclosure relates to an electronic apparatus and a control method thereof, and more particularly, to an electronic apparatus for providing a screen in a posture optimized for a user, and a control method thereof.

Description of the Related Art

Due to advancements in electronic technology, electronic apparatuses that provide various functions have been developed. As recent electronic apparatuses have a smaller size, an environment is being formed where a content may be consumed in various places besides simply a living room.

For example, a user may want to use a display in a comfortable posture on a sofa, a bed, or the like without holding the display with his or her hands. As shown in FIG. 1A, a smartphone/tablet holder may manually adjust the display to a desired height or angle.

However, as shown in FIG. 1B, in case of the holder, the user needs to directly move the holder for each space and adjust its angle whenever changing his or her posture, and there is a limit to a size of the display which may be mounted on the holder.

SUMMARY

According to an aspect of the disclosure, an electronic apparatus includes a camera; a driver; a display; and at least one processor operatively connected to the camera, the driver, and the display, and configured to: control the camera to capture an image, identify a user posture included in the captured image, identify at least one parameter among a plurality of parameters related to a user based on the user posture, and control the driver to change a position of the electronic apparatus based on the at least one parameter, and change a posture of the display.

The electronic apparatus may further include a communication interface; and a microphone, wherein the at least one processor may be further configured to: control the driver to move the electronic apparatus toward the user based on a user command being received from another electronic apparatus through the communication interface or the user command being received through the microphone, and control the camera to capture a plurality of images at a predetermined time interval.

The at least one processor may be further configured to: identify the user posture and a distance from the electronic apparatus to the user based on the plurality of images, and stop an operation of the driver based on the distance from the electronic apparatus to the user corresponding to the user posture.

The at least one processor may be further configured to: identify the plurality of parameters related to the user based on the captured image, identify the user posture based on the plurality of parameters, based on the user posture being a first posture, change the posture of the display based on at least one first parameter among the plurality of parameters, and based on the user posture being a second posture, change the posture of the display based on at least one second parameter among the plurality of parameters.

The at least one processor may be further configured to: control the display to display a content, and change the posture of the display based on a content type and the user posture.

The at least one processor may be further configured to, based on the user posture being changed and a predetermined time elapsing, change the posture of the display based on the changed user posture.

The at least one processor may be further configured to: control the camera to capture a plurality of images at a predetermined time interval, acquire a predicted user posture at a predetermined time point from a current time point based on the plurality of images, and change the posture of the display based on the user posture and the predicted user posture.

The electronic apparatus may further include a memory configured to store a first neural network model, wherein the at least one processor may be further configured to identify the user posture by inputting the captured image to the first neural network model.

The electronic apparatus may further include a memory configured to store a second neural network model, wherein the at least one processor may be further configured to: acquire data on the posture of the display by inputting the plurality of parameters to the second neural network model, and change the posture of the display based on the data on the posture of the display.

The electronic apparatus may further include a user interface, wherein the at least one processor may be further configured to: based on a user command to change the posture of the display being received through the user interface, change the posture of the display based on the user command, and update the second neural network model based on the plurality of parameters and the changed posture of the display.

The electronic apparatus may further include a microphone, wherein the at least one processor may be further configured to: control the camera to capture a plurality of images at a predetermined time interval, and change the posture of the display based on a user gesture identified from the plurality of images, or based on a user voice to change the posture of the display received through the microphone.

The camera may be disposed on one side of the display, and wherein the at least one processor may be further configured to change the posture of the display for the user or for a predetermined user body part included within a predetermined region in the captured image.

The electronic apparatus may further include a display posture driver, wherein the at least one processor may be further configured to control the display posture driver to change the posture of the display.

The at least one processor may be further configured to control the driver to change the position of the electronic apparatus based on movement of the user posture.

According to an aspect of the disclosure, a control method includes: capturing an image; identifying a user posture included in the captured image; identifying at least one parameter among a plurality of parameters related to a user based on the user posture; and changing a position of the electronic apparatus based on the at least one parameter, and changing a posture of a display included in the electronic apparatus.

According to an aspect of the disclosure, an electronic apparatus includes: a memory configured to store instructions; at least one processor configured to: obtain an image captured by a camera; identify a user posture included in the captured image, identify at least one parameter among a plurality of parameters related to a user based on the user posture, and control the electronic apparatus to change a position of the electronic apparatus based on the at least one parameter, and change a posture of a display.

The at least one processor may be further configured to: control to move the electronic apparatus toward the user based on a user command being received; and control to capture a plurality of images at a predetermined time interval.

The at least one processor may be further configured to: identify the user posture and a distance from the electronic apparatus to the user based on the plurality of images, and stop an operation of the electronic apparatus based on the distance from the electronic apparatus to the user corresponding to the user posture.

The at least one processor may be further configured to: identify the plurality of parameters related to the user based on the captured image, identify the user posture based on the plurality of parameters, based on the user posture being a first posture, change the posture of the display based on at least one first parameter among the plurality of parameters, and based on the user posture being a second posture, change the posture of the display based on at least one second parameter among the plurality of parameters.

The at least one processor may be further configured to: control the display to display a content, and change the posture of the display based on a content type and the user posture.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 15 is a flowchart illustrating a control method of an electronic apparatus according to one or more embodiments of the disclosure.

DETAILED DESCRIPTION

Figure 1A:
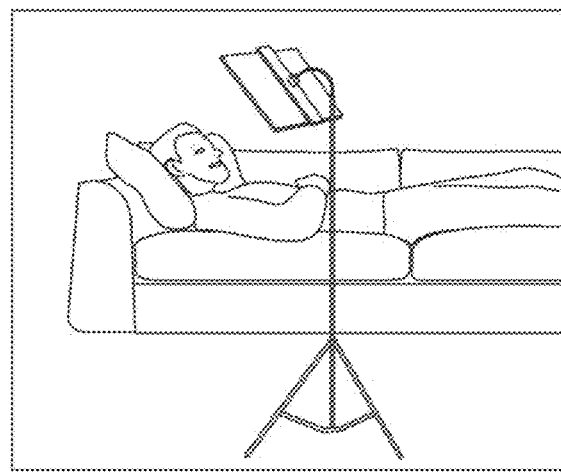
FIGS. 1A and 1B are views illustrating an example holder apparatus.
Figure 1B:
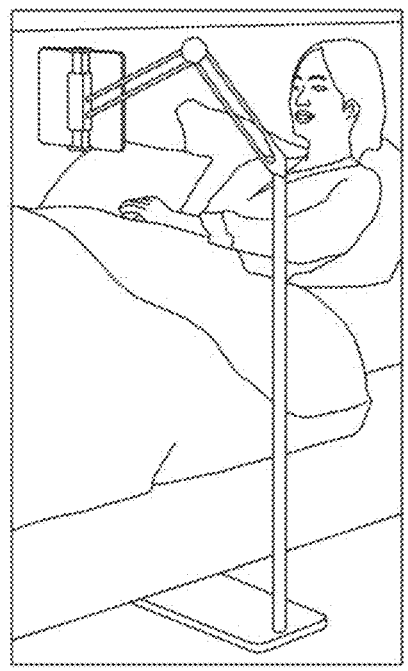

Example embodiments are illustrated in the drawings and are described in detail in the detailed description. However, it is to be understood that the disclosure is not limited to a specific embodiment, but includes all modifications, equivalents, and substitutions without departing from the scope and spirit of the disclosure. Also, well-known functions or constructions are not described in detail since they would obscure the disclosure with unnecessary detail.

Provided is an electronic apparatus for providing a screen in a posture optimized for a user posture, and a control method thereof.

Hereinafter, the disclosure is described in detail with reference to the accompanying drawings.

General terms that are currently widely used are selected as terms used in embodiments of the disclosure in consideration of functions in the disclosure, and may be changed based on the intentions of those skilled in the art or a judicial precedent, the emergence of a new technique, or the like. In addition, in a specific case, terms arbitrarily chosen by an applicant may exist. The meanings of such terms are mentioned in detail in corresponding descriptions of the disclosure. Therefore, the terms used in the embodiments of the disclosure need to be defined on the basis of the meanings of the terms and the contents throughout the disclosure rather than simple names of the terms.

In the disclosure, an expression "have," "may have," "include," "may include" or the like, indicates the existence of a corresponding feature (for example, a numerical value, a function, an operation or a component such as a part), and does not exclude the existence of an additional feature.

An expression, "at least one of A or B" may indicate only A, only B, or both A and B.

Expressions "first," "second," and the like, used in the specification may indicate various components regardless of a sequence or importance of the components. These expressions are used only to distinguish one component from another component, and do not limit the corresponding components.

A term of a singular number may include its plural number unless explicitly indicated otherwise in the context. It is to be understood that a term "include," "formed of," or the like used in the application specifies the presence of features, numerals, steps, operations, components, parts, or combinations thereof, mentioned in the specification, and does not preclude the presence or addition of one or more other features, numerals, steps, operations, components, parts, or combinations thereof.

In the specification, such a term as a "user" may refer to a person who uses an electronic apparatus or an apparatus (for example, an artificial intelligence electronic apparatus) which uses an electronic apparatus.

Hereinafter, the embodiments of the disclosure are described in detail with reference to the accompanying drawings.

Figure 2:
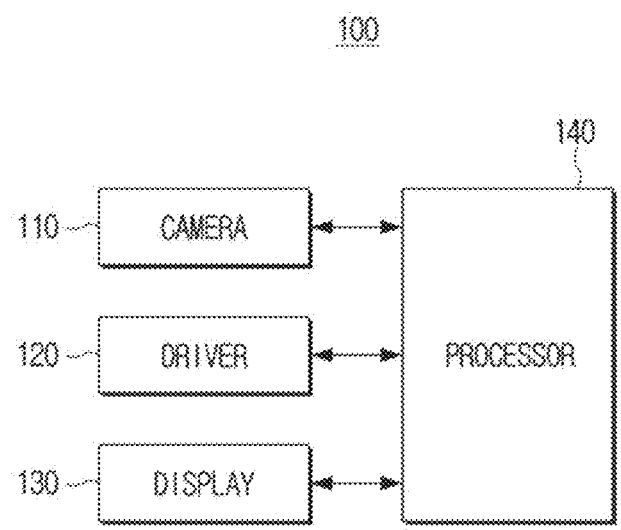
FIG. 2 is a block diagram showing a configuration of an electronic apparatus according to one or more embodiments of the disclosure.

FIG. 2 is a block diagram showing a configuration of an electronic apparatus 100 according to one or more embodiments of the disclosure.

The electronic apparatus 100 may be an apparatus providing a screen to a user. For example, the electronic apparatus 100 may be an apparatus having a display and providing a displayed screen in a posture optimized for the user. Here, the display may be a component included in the electronic apparatus 100. However, the disclosure is not limited thereto, and a television (TV), a monitor, a laptop computer, a smartphone, a tablet personal computer (PC), or the like may be attached to the electronic apparatus 100 and operated as the display. The display may be detachable from the electronic apparatus 100.

However, the disclosure is not limited thereto, and the electronic apparatus 100 may be an apparatus mounting a device having the display therein and providing the position and direction of the display of the mounted device in the posture optimized for the user.

Referring to FIG. 2, the electronic apparatus 100 may include a camera 110, a driver 120, a display 130, and a processor 140.

The camera 110 may be a component for capturing a still image or a moving image. The camera 110 may capture the still image at a specific time point, and may also continuously capture the still images.

The camera 110 may capture one direction of the electronic apparatus 100. In particular, the processor 140 may identify a user position, a user posture, or the like based on the image captured by the camera 110.

The camera 110 may include a lens, a shutter, an aperture, a solid-state imaging device, an analog front end (AFE), and a timing generator (TG). The shutter may adjust time at which light reflected from a subject enters the camera 110, and the aperture may mechanically increase or decrease a size of an opening through which light enters, thereby controlling an amount of light incident on the lens. The solid-state imaging device may output the image by photoelectric charge as an electrical signal if light reflected from the subject is accumulated as the photoelectric charge. The TG may output a timing signal for reading out pixel data of the solid-state imaging device, and the AFE may sample and digitize the electrical signal output from the solid-state imaging device.

The camera 110 may be disposed on one side of the display 130. However, the disclosure is not limited thereto, and the camera 110 may be disposed in another position of the electronic apparatus 100. For example, the camera 110 may be disposed at a portion connecting the driver 120 and the display 130 to each other. The camera 110 may be disposed in any position where the camera may capture the user.

The driver 120 may be a component moving the position of the electronic apparatus 100 under control of the processor 140, and may include a wheel, a motor, or the like. However, the disclosure is not limited thereto, and the driver 120 may have any configuration as long as the driver may move the position of the electronic apparatus 100.

The display 130 may be a component displaying the image, and may be implemented as various types of displays such as a liquid crystal display (LCD), an organic light emitting diode (OLED) display, and a plasma display panel (PDP). The display 130 may also include a driving circuit, a backlight unit, or the like, which may be implemented in a form such as an a-si thin film transistor (TFT), a low temperature poly silicon (LTPS) TFT, or an organic TFT (OTFT). The display 130 may be implemented as a touch screen combined with a touch sensor, a flexible display, a three-dimensional (3D) display, or the like.

The processor 140 may control overall operations of the electronic apparatus 100. In detail, the processor 140 may be connected to each component of the electronic apparatus 100 to thus control the overall operations of the electronic apparatus 100. For example, the processor 140 may be connected to the components such as the camera 110, the driver 120, the display 130, or a communication interface to thus control the operations of the electronic apparatus 100.

At least one processor 140 may include at least one of a central processing unit (CPU), a graphics processing unit (GPU), an accelerated processing unit (APU), a many integrated core (MIC), a neural processing unit (NPU), a hardware accelerator, or a machine learning accelerator. At least one processor 140 may control one of other components of the electronic apparatus 100 or any combination thereof, and perform operations related to the communication or data processing. At least one processor 140 may execute at least one program or instruction stored in a memory. For example, at least one processor 140 may perform a method according to one or more embodiments of the disclosure by executing at least one instruction stored in the memory.

A plurality of operations may be performed by one processor or may be performed by a plurality of processors if the method according to one or more embodiments of the disclosure includes the plurality of operations. For example, a first operation, a second operation, and a third operation may be performed by the method according to one or more embodiments. The first operation, the second operation, and the third operation may all be performed by a first processor. Alternatively, the first operation and the second operation may all be performed by the first processor (for example, a general-purpose processor), and the third operation may be performed by a second processor (for example, an artificial intelligence-only processor).

At least one processor 140 may be implemented as a single core processor including one core, or may be implemented as at least one multicore processor including a plurality of cores (e.g., homogeneous multicores or heterogeneous multicores). If at least one processor 140 is implemented as the multicore processor, each of the multicores included in the multicore processor may include a processor internal memory such as a cache memory or an on-chip memory, and a common cache shared by the multicores may be included in the multicore processor. In addition, each of the multicores (or some of the multicores) included in the multicore processor may independently read and perform a program instruction for implementing the method according to one or more embodiments of the disclosure. Alternatively, all (or some) of the multicores may be linked to read and perform the program instruction for implementing the method according to one or more embodiments of the disclosure.

The plurality of operations may be performed by one core among the multicores included in the multicore processor, or may be performed by the multicores if the method according to one or more embodiments of the disclosure includes the plurality of operations. For example, the first operation, the second operation, and the third operation may be performed by the method according to one or more embodiments. The first operation, the second operation, and the third operation may all be performed by a first core included in the multicore processor. Alternatively, the first operation and the second operation may be performed by the first core included in the multicore processor, and the third operation may be performed by a second core included in the multicore processor.

In one or more embodiments of the disclosure, the processor may refer to a system-on-chip (SoC) in which at least one processor and other electronic components are integrated, the single core processor, the multicore processor, or a core included in the single core processor or the multicore processor. Here, the core may be implemented as the CPU, the GPU, the APU, the MIC, the NPU, the hardware accelerator or the machine learning accelerator. However, the embodiments of the disclosure are not limited thereto. However, for convenience of description, the operation of the electronic apparatus 100 is hereinafter described with the expression "the processor 140."

The processor 140 may capture the image by using the camera 110, and identify the user posture included in the captured image. For example, the processor 140 may identify the user posture by inputting the captured image to a first neural network model. Alternatively, the processor 140 may identify the user's main part from the captured image, and identify the user posture based on the identified main part. For example, the processor 140 may identify the user's eyes, shoulders, waist, knees, or ankles, and identify the user posture based on a position of the main part and a distance between the main parts.

The processor 140 may identify at least one parameter among the plurality of parameters related to the user based on the user posture, control the driver 120 to change the position of the electronic apparatus 100 based on at least one parameter, and may change a posture of the display 130.

For example, the user may have a sitting posture. In this case, the processor 140 may identify a yaw angle, a pitch angle, and a roll angle, representing the user's eye height, eye position, or head/body orientation, may control the driver 120 to change the position of the electronic apparatus 100 to a predetermined position in front of the user based on at least one parameter, and may change the posture of the display 130. Here, the predetermined position may be a position of the electronic apparatus 100 determined during its manufacture. For example, the predetermined position may be a position of the electronic apparatus 100 at 1 m in front of the user. The predetermined position may be changed based on a user manipulation. For example, the user may manually change the position of the electronic apparatus 100. In this case, the electronic apparatus 100 may have the predetermined position changed based on the user's manual manipulation. The posture of the display 130 may represent the orientation and height of the display 130, and the orientation of the display 130 may be represented by the yaw angle, the pitch angle, or the roll angle. The yaw angle may be an angle changed on a horizontal plane in left and right directions, the pitch angle may be an angle at which the horizontal plane is tilted up and down, and the roll angle may be an angle at which the horizontal plane is tilted left and right.

Alternatively, the user may have a standing posture. In this case, the processor 140 may identify the yaw angle representing the eye height, the eye position, or the body orientation, control the driver 120 to change the position of the electronic apparatus 100 to the predetermined position in front of the user based on the identified parameter, and may change the posture of the display 130.

Alternatively, the user may have a lying posture. In this case, the processor 140 may identify the yaw angle or the roll angle, representing the eye height, the eye position, or the body orientation, may control the driver 120 to change the position of the electronic apparatus 100 to the predetermined position in front of the user based on the identified parameter, and may change the posture of the display 130.

That is, the processor 140 may change the parameter used to change the position of the electronic apparatus 100 or the posture of the display 130 based on the user posture. Here, the processor 140 may acquire the plurality of parameters from the captured image if the image is captured by the camera 110. Alternatively, the processor 140 may acquire the plurality of parameters related to the user through a sensor. Alternatively, the processor 140 may acquire the plurality of parameters after the user is identified.

The processor 140 may identify the user position or the user posture from the image captured by the camera 110, may control the driver 120 to change the position of the electronic apparatus 100 to the predetermined position in front of the user based on the user position, may finely adjust the position of the electronic apparatus 100 based on the user posture, and may change the posture of the display 130. For example, the processor 140 may identify the user from the captured image and move toward the user. For example, the user may be identified on the left from the center of the captured image. The processor 140 may control the driver 120 for the electronic apparatus 100 to move forward to the left. Here, the driver 120 may include at least one wheel and at least one motor, and may have any configuration as long as the driver may move the electronic apparatus 100. The processor 140 may then change the position of the electronic apparatus 100 based on the user posture. That is, the processor 140 may roughly move the electronic apparatus 100 based on the user position, and then identify a final position of the electronic apparatus 100 based on the user posture if the user posture is identified.

The electronic apparatus 100 may further include the communication interface and a microphone, and the processor 140 may control the driver 120 to move toward the user based on a user command or a user voice if the user command calling the electronic apparatus 100 from another electronic apparatus through the communication interface, or receive the user voice calling the electronic apparatus 100 through the microphone, and acquire the plurality of images by turning on the camera 110 to capture the images at a predetermined time interval. The processor 140 may identify the user posture and its distance to the user in real time from the images acquired at the predetermined time interval, and stop an operation of the driver 120 if the distance to the user corresponds to the user posture. In addition, the processor 140 may maintain the camera 110 to be turned on.

For example, the user may input the user command for calling the electronic apparatus 100 through a device such as a smartphone or call the electronic apparatus 100 through the user voice. The processor 140 may change the position of the electronic apparatus 100 based on the user command received from a smartphone or the user voice received through the microphone. For example, if the user command of "come to the living room" is input by the user, the processor 140 may move to the living room through text recognition. Alternatively, the electronic apparatus 100 may include the plurality of microphones, and the processor 140 may identify the user's speaking position through the plurality of microphones and move to the user position. The processor 140 may turn on the camera 110 to capture the image while changing the position of the electronic apparatus 100, and stop changing the position of the electronic apparatus 100 based on the user identified in the image. For example, the processor 140 may turn on the camera 110 to capture the image while changing the position of the electronic apparatus 100, and stop changing the position of the electronic apparatus 100 if a distance between the electronic apparatus 100 and the user is a predetermined distance based on the user identified in the image. The position of the electronic apparatus 100 may be efficiently changed through this operation. In addition, unnecessary power consumption by the camera may be reduced because the camera 110 is turned on after the user command is input or the user voice is received.

Alternatively, if the user command calling the electronic apparatus 100 is received from another electronic apparatus through the communication interface, or the user voice calling the electronic apparatus 100 is received through the microphone, the processor 140 may turn on the camera 110 to capture the images at the predetermined time interval to acquire the plurality of images, and control the driver 120 to move toward the user identified from each of the plurality of images.

However, the disclosure is not limited thereto. The processor 140 may capture the images by the camera 110 at the predetermined time interval, and control the driver 120 to move toward the user if a predetermined user gesture is identified. That is, the processor 140 may control the driver 120 to move toward the user based on the predetermined gesture even though there is no user command or user voice. Here, the predetermined gesture may be a gesture for calling the electronic apparatus 100, and include at least one of a gesture stored at the time of manufacture or a gesture set by the user. Alternatively, the electronic apparatus 100 may pre-store data on the plurality of predetermined positions, and the processor 140 may change the position of the electronic apparatus 100 to one of the plurality of predetermined positions based on the user command or the user voice. For example, the user may manually move the electronic apparatus 100 to a specific position in a bedroom, and map and store the specific position together with the command "bedroom," and the processor 140 may change the position of the electronic apparatus 100 to the predetermined position in the bedroom if the user voice of "bedroom" is received. The processor 140 may turn on the camera 110 after the movement is completed rather than turning on the camera while the electronic apparatus 100 is moving. In addition, the processor 140 may identify the user posture through capturing one image rather than capturing the plurality of images after the camera 110 is turned on.

However, the disclosure is not limited thereto, and the command mapping as above may be performed in various ways. For example, the electronic apparatus 100 may move to the specific position based on the user call, and then ask the user whether the command mapping is required. Alternatively, the electronic apparatus 100 may move to the specific position based on the user call, and then map and store the specific position and the command if the user feels that the operation of the electronic apparatus at the specific position is comfortable. Alternatively, the electronic apparatus 100 may identify a plan view of a place where the user is positioned while moving based on the user call, identify a type of each space in the plan view, and identify the predetermined position based on the type of each space. For example, the electronic apparatus 100 may identify the plan view including a first region where the electronic apparatus 100 is movable and a second region where there is an obstacle such as a wall in the place where the user is positioned while moving based on the user call, may identify whether the first region is the living room, or the like, and may identify the predetermined position based on each type of the first region. Here, the predetermined position may be a position set by the manufacturer. For example, the center may be pre-stored as the predetermined position in a living room type space.

The camera 110 may be maintained to be turned on while the user views a content through the display 130. For example, the camera 110 may be maintained to be turned on by time at which the user turns off the electronic apparatus 100. However, the disclosure is not limited thereto, and the camera 110 may always be turned on. For example, the camera 110 may be turned on even while the display 130 is not displaying the content. The processor 140 may control the electronic apparatus 100 by detecting the user gesture from the images continuously captured by the camera 110.

The processor 140 may identify the plurality of parameters related to the user based on the captured image, and identify the user posture based on the plurality of parameters. For example, the processor 140 may identify the yaw angle, the pitch angle, or the roll angle, representing the user position or head/body orientation, a change (sitting, lying, standing, or the like) in the posture, the user gesture, a user key point, and the like as the plurality of parameters based on the captured image. However, the disclosure is not limited thereto, and the plurality of parameters related to the user may include various elements. Here, the user key point may represent the user's main body part, and may be predetermined by the manufacturer. For example, the user key point may include at least one of the user's eyes, ears, neck, shoulders, elbows, hips, or knees. However, the disclosure is not limited thereto, and the user key point may include the user's various main body parts.

The processor 140 may change the posture of the display 130 based on at least one first parameter among the plurality of parameters if the user posture is a first posture, and the processor 140 may change the posture of the display 130 based on at least one second parameter among the plurality of parameters if the user posture is a second posture. That is, the processor 140 may change the posture of the display 130 by using at least one parameter among the plurality of parameters identified based on the user posture. Here, at least one first parameter used in case of the first posture and at least one second parameter used in case of the second posture may partially overlap each other.

However, the disclosure is not limited thereto, and the processor 140 may change the posture of the display 130 by using the user posture and all of the plurality of parameters. Alternatively, the processor 140 may change the posture of the display 130 by using all of the plurality of parameters. For example, the processor 140 may determine whether to use all the parameters or some parameters based on a spare resource of the electronic apparatus 100.

The processor 140 may control the display 130 to display the content, and change the posture of the display 130 based on a content type and the user posture. For example, if the content type is a second type rather than a first type even though the user posture is the same, the processor 140 may increase a height of the display 130 or further change a direction of the display 130. For example, the processor 140 may increase the height of the display for the plurality of users to watch the content if the content type is a sports broadcast rather than a game broadcast.

If the user posture is changed, the processor 140 may change the posture of the display 130 based on the changed user posture. For example, if a height of a user face is changed, the processor 140 may change the height of the display 130 based on the height of the user face.

Alternatively, the processor 140 may change the posture of the display 130 based on a changed user posture if the user posture is changed and predetermined time elapses. For example, if the height of the user face is changed and one minute elapses, the processor 140 may change the height of the display 130 based on the height of the user face. Here, the predetermined time may be changed in various ways.

However, the disclosure is not limited thereto, and the processor 140 may change the posture of the display 130 only if one of the user's sitting posture, standing posture, and lying posture is changed to another posture. For example, if the user posture is changed from the sitting posture to the standing posture and the predetermined time elapses, the processor 140 may change the posture of the display 130 based on the changed user posture. However, if only the height of the user face is changed in the user's sitting posture, the processor 140 may not change the posture of the display 130.

In addition, if the user posture is changed and the predetermined time elapses, the processor 140 may change the position of the electronic apparatus 100 based on the changed user posture. For example, if the user posture is changed from the sitting posture to the standing posture and the predetermined time elapses, the processor 140 may increase the distance between the user and the electronic apparatus 100.

The processor 140 may acquire the plurality of images by capturing the images by the camera 110 at the predetermined time interval, acquire a predicted user posture at a predetermined time point from a current time point based on the plurality of images, and change the posture of the display 130 based on the user posture and the predicted user posture. In addition, the processor 140 may change the position of the electronic apparatus 100 based on the user posture and the predicted user posture. Through this operation, the processor 140 may solve the user's inconvenience due to delay time caused by a change in the user's physical movement or physical posture.

The electronic apparatus 100 may further include the memory storing the first neural network model, and the processor 140 may identify the user posture by inputting the captured image to the first neural network model. However, the disclosure is not limited thereto, and the processor 140 may identify the user posture from the image through a rule-based model. Here, the first neural network model may be a model acquired by learning a sample image including the user and data on the user posture corresponding to the sample image.

Alternatively, the electronic apparatus 100 may further include a memory storing a second neural network model, and the processor 140 may acquire data on the posture of the display 130 by inputting the plurality of parameters to the second neural network model, and change the posture of the display 130 based on the data on the posture of the display 130. For example, the processor 140 may input the plurality of parameters to the second neural network model to acquire the height, yaw angle, pitch angle, or roll angle of the display 130, and change the posture of the display 130 based on the height, the yaw angle, the pitch angle, or the roll angle. Here, the second neural network model may be a model acquired by learning a plurality of sample parameters and the data on the posture of the display 130 corresponding to the plurality of sample parameters.

Here, the electronic apparatus 100 may further include a user interface such as a button, a touch pad, a mouse, a keyboard, or a touch screen. The processor 140 may change the posture of the display 130 based on a user command if the user command to change the posture of the display 130 is received through the user interface, and update the second neural network model based on the plurality of parameters and the changed posture of the display 130. Through this operation, the processor may implement the electronic apparatus 100 operated adaptively to the user. That is, the posture of the display 130 may be changed based on the user's manual manipulation even though there is no change in the user posture, and the processor 140 may learn this case and provide the user with an optimal posture of the display 130.

The electronic apparatus 100 may further include the microphone, and the processor 140 may acquire the plurality of images by capturing the images by using the camera 110 at the predetermined time interval, and change the posture of the display 130 based on the user gesture or the user voice if the predetermined user gesture is identified from the plurality of images or the user voice to change the posture of the display 130 is received through the microphone. Here, the predetermined time interval may be a frame per second (fps) of the camera 110. However, the disclosure is not limited thereto. For example, the predetermined time interval may be lower than the fps of the camera 110, thus reducing power consumption. Alternatively, the predetermined time interval may be changed based on the distance between the electronic apparatus 100 and the user. For example, the predetermined time interval may be a first time interval if the distance between the electronic apparatus 100 and the user is the predetermined distance or more, and the predetermined time interval may be a second time interval smaller than the first time interval if the distance between the electronic apparatus 100 and the user is less than the predetermined distance.

However, the disclosure is not limited thereto, and the processor 140 may change the posture of the display 130 based on the user command received from a smartphone or the like.

The camera 110 may be disposed on one side of the display 130, and the processor 140 may change the posture of the display 130 for the user or a predetermined user body part to be included within a predetermined region in the captured image. For example, the processor 140 may change the posture of the display 130 for the user face to be included within the predetermined distance from the center of the captured image. That is, the processor 140 may maintain the posture of the display 130 for the camera 110 to capture the user in front of the display 130 while changing the posture of the display 130. Accordingly, the processor 140 may prevent a problem of failing to capture the user due to an extreme change in the posture of the display 130.

The electronic apparatus 100 may further include a display posture driver 190, and the processor 140 may control the display posture driver to change the posture of the display 130.

Functions of the electronic apparatus that is related to an artificial intelligence according to the disclosure may be operated through the processor 140 and the memory.

The processor 140 may include at least one processor. Here, at least one processor may be a general-purpose processor such as the central processing unit (CPU), an application processor (AP) or a digital signal processor (DSP), a graphics-only processor such as the graphic processing unit (GPU) or a vision processing unit (VPU), or the artificial intelligence-only processor such as the neural processing unit (NPU).

At least one processor may control input data to be processed based on a pre-defined operation rule or an artificial intelligence model stored in the memory. Alternatively, at least one processor may be the artificial intelligence-only processor. The artificial intelligence-only processor may be designed to have a hardware structure specialized to process a specific artificial intelligence model. The pre-defined operation rule or the artificial intelligence model may be generated by learning.

Here, to be generated by the learning may indicate that a basic artificial intelligence model perform the learning by using a number of learning data, based on a learning algorithm, thereby generating the pre-defined operation rule or the artificial intelligence model, set to perform a desired feature (or purpose). Such learning may be performed by a machine itself in which the artificial intelligence is performed according to the disclosure, or by a separate server or system. An example of the learning algorithm may include, supervised learning, unsupervised learning, semi-supervised learning, or reinforcement learning, and may not be limited thereto.

The artificial intelligence model may include a plurality of neural network layers. The plurality of neural network layers may each have a plurality of weight values, and perform a neural network operation by using an operation between an operation result of a previous layer and the plurality of weight values. The plurality of weight values of the plurality of neural network layers may be optimized by a learning result of the artificial intelligence model. For example, the plurality of weight values may be updated during a learning process to reduce or minimize a loss value or a cost value, acquired from the artificial intelligence model.

For example, the first neural network model may be a model acquired by learning the plurality of sample images and the user postures included in the plurality of sample images. Here, the plurality of sample images may be the captured image to include the user, and the user postures included in the plurality of sample images may be manually input data. The second neural network model may be a model acquired by learning the plurality of sample parameters and the data on the posture of the display 130 corresponding to the plurality of sample parameters. The second neural network model may be updated by performing additional learning based on the user manipulation. For example, if the posture of the display 130 is changed based on the user manipulation with no change in the user posture, the second neural network model may be updated by additionally learning the plurality of sample parameters corresponding to the user postures and the changed posture of the display 130.

An artificial neural network may include a deep neural network (DNN), may include, for example, a convolutional neural network (CNN), the deep neural network (DNN), a recurrent neural network (RNN), a restricted Boltzmann machine (RBM), a deep belief network (DBN), a bidirectional recurrent deep neural network (BRDNN), a generative adversarial network (GAN), or a deep q-network, or the like, and is not limited thereto.

Figure 3:
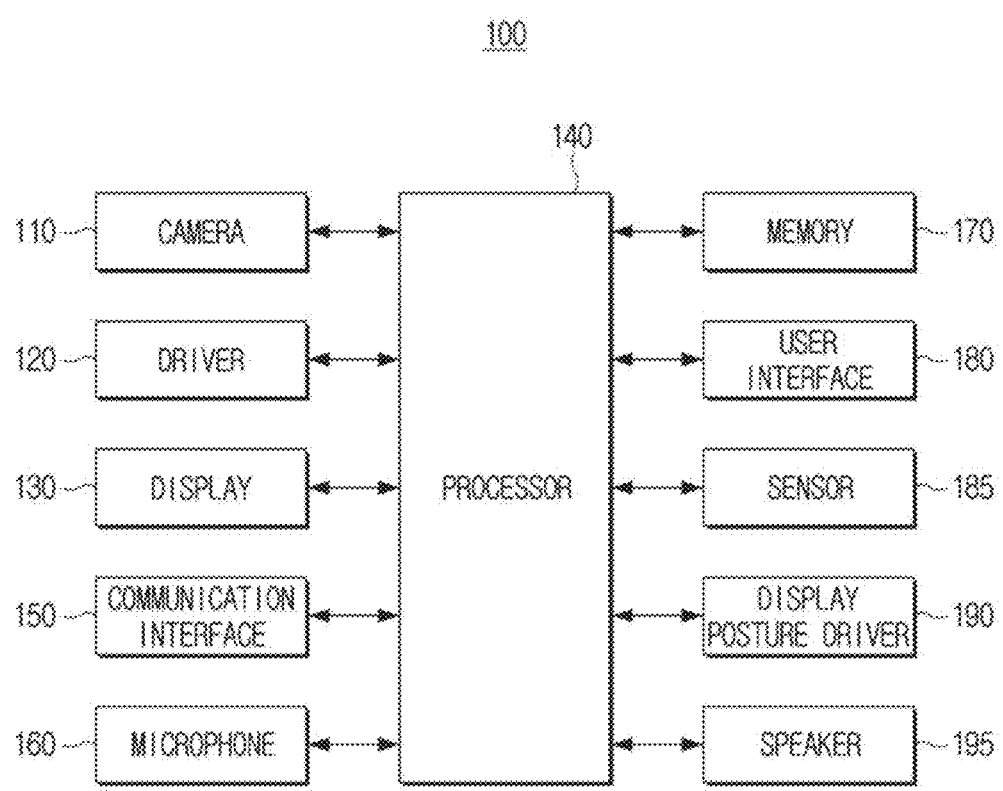
FIG. 3 is a block diagram showing a detailed configuration of the electronic apparatus according to one or more embodiments of the disclosure.

FIG. 3 is a block diagram showing a detailed configuration of the electronic apparatus 100 according to one or more embodiments of the disclosure.

The electronic apparatus 100 may include the camera 110, the driver 120, the display 130, and the processor 140. In addition, according to FIG. 3, the electronic apparatus 100 may further include a communication interface 150, a microphone 160, a memory 170, a user interface 180, a sensor 185, a display posture driver 190, and a speaker 195. The description omits descriptions of components that are the same as the components shown in FIG. 2 among the components shown in FIG. 3.

The communication interface 150 may be a component communicating with various types of external devices by using various types of communication methods. For example, the electronic apparatus 100 may communicate with a user terminal device or a server through the communication interface 150.

The communication interface 150 may include a wireless-fidelity (Wi-Fi) module, a Bluetooth module, an infrared communication module, a wireless communication module, or the like. Here, each communication module may be implemented in the form of at least one hardware chip.

The Wi-Fi module and the Bluetooth module may respectively perform the communication in a Wi-Fi manner and a Bluetooth manner. In case of using the Wi-Fi module or the Bluetooth module, it is possible to first transmit and receive various connection data such as a service set identifier (SSID) or a session key, connect the communication by using this connection data, and then transmit and receive various data. The infrared communication module may perform the communication based on infrared data association (IrDA) technology that wirelessly transmits data in a short distance by using an infrared ray between visible and millimeter waves.

In addition to the above-described communication manners, the wireless communication module may include at least one communication chip performing the communication based on various wireless communication standards such as zigbee, third generation (3G), third generation partnership project (3GPP), long term evolution (LTE), LTE advanced (LTE-A), fourth generation (4G) and fifth generation (5G).

Alternatively, the communication interface 150 may include a wired communication interface such as a high definition multimedia interface (HDMI), a display port (DP), a thunderbolt, a universal serial bus (USB), a red-green-blue (RGB) port, a D-subminiature (D-SUB), a digital visual interface (DVI), or the like.

In addition, the communication interface 150 may include at least one of wired communication modules performing the communication by using a local area network (LAN) module, an Ethernet module, a pair cable, a coaxial cable, an optical fiber cable, or the like.

The microphone 160 may be a component for receiving sound and converting the same into an audio signal, which is the electrical signal. The microphone 160 may be electrically connected to the processor 140, and may receive the sound under the control of the processor 140.

For example, the microphone 160 may be disposed on the top, front, or lateral side of the electronic apparatus 100. Alternatively, the microphone 160 may be disposed in a device separate from the electronic apparatus 100, for example, a remote controller. The remote controller, which may be a separate device, may receive the sound through the microphone 160, and provide the electronic apparatus 100 with the audio signal, which is the electrical signal corresponding to the received sound.

The microphone 160 may include various components such as a microphone collecting the sound in an analog form, an amplifier circuit amplifying the collected sound, an analog to digital (A/D) conversion circuit sampling the amplified sound and converting the same into a digital signal, and a filter circuit removing a noise component from the converted digital signal.

The microphone 160 may be implemented in the form of a sound sensor, and may use any method by which the sound may be collected.

The memory 170 may refer to hardware storing data in an electrical or magnetic form for the processor 140 or the like to access the data. To this end, the memory 170 may be implemented as a non-volatile memory, a volatile memory, a flash memory, a hard disk drive (HDD), a solid state drive (SSD), a random access memory (RAM), a read only memory (ROM), or the like.

The memory 170 may store at least one instruction necessary for the operation of the electronic apparatus 100 or the processor 140. Here, the instruction is a code unit indicating the operation of the electronic apparatus 100 or the processor 140, and may be written in machine language, which is a language that a computer may understand. Alternatively, the memory 170 may store the plurality of instructions for performing a specific task of the electronic apparatus 100 or the processor 140 as an instruction set.

The memory 170 may store data in units of bits or bytes which may represent characters, numbers, images, or the like. For example, the memory 170 may store the neural network model, or the like.

The memory 170 may be accessed by the processor 140, and the readout, recording, correction, deletion, update, or the like of the instructions, the instruction set, or data may be performed by the processor 140.

The user interface 180 may be implemented as a button, a touch pad, a mouse or a keyboard, or may be implemented as a touch screen which may perform both a display function and a manipulation input function. Here, the button may be any of various types of buttons such as a mechanical button, a touch pad, and a wheel, which is disposed on any region of a body appearance of the electronic apparatus 100, such as its front surface portion, side surface portion, or rear surface portion.

The sensor 185 may include at least one of a sensor with red, green, blue plus depth data (RGB-D sensor) or a time-of-flight (ToF) sensor. The processor 140 may acquire an RGB image in a visible ray region, a depth image through the infrared ray (IR), and a thermal image through the IR through the RGB-D sensor. The ToF sensor is a three-dimensional sensor, and may be a sensor recognizing the three-dimensional effect, spatial data, and movement of an object by calculating a distance at which light emitted from the object through an infrared wavelength bounces back in time.

The sensor 185 may further include an illuminance sensor. The illuminance sensor may be a sensor detecting illuminance representing an amount of light received per unit area per unit time.

The display posture driver 190 may be a component for changing the posture of the display 130. For example, the display posture driver 190 may include a first driver for changing the height of the display 130 and three second drivers for changing a three-axis angle of the display; and may change the posture of the display 130 by changing at least one of the height of the display 130 or the three-axis angle. Here, the first driver may include a first motor to which a cogwheel is connected and a member in which one corner of the cogwheel is engaged with the cogwheel. The first driver may drive the first motor under the control of the processor 140, and move the member up and down as the first motor is driven. Here, the member may be connected to the display 130. Each of the three second drivers may include a second motor to which a cogwheel is connected. Each of the three second drivers may drive the second motor under the control of the processor 140, and rotate the display 130 as the second motor is driven. Here, the three second drivers may be implemented to rotate the display 130 in directions perpendicular to each other. However, the disclosure is not limited thereto, and the display posture driver 190 may be implemented in various forms.

The speaker 195 may be a component outputting various notification sounds, an audio message, or the like, as well as various audio data processed by the processor 140.

As described above, the electronic apparatus 100 may improve user convenience by providing the screen in the posture optimized for the user. In addition, the electronic apparatus 100 may perform an adaptive operation to the user by learning the user posture and the posture of the display.

Hereinafter, the description describes the operation of the electronic apparatus 100 in more detail with reference to FIGS. 4 through 13. Individual embodiments are described with reference to FIGS. 4 through 13 for convenience of description. However, the individual embodiments described with reference to FIGS. 4 through 13 may be implemented in any combination thereof.

Figure 4:
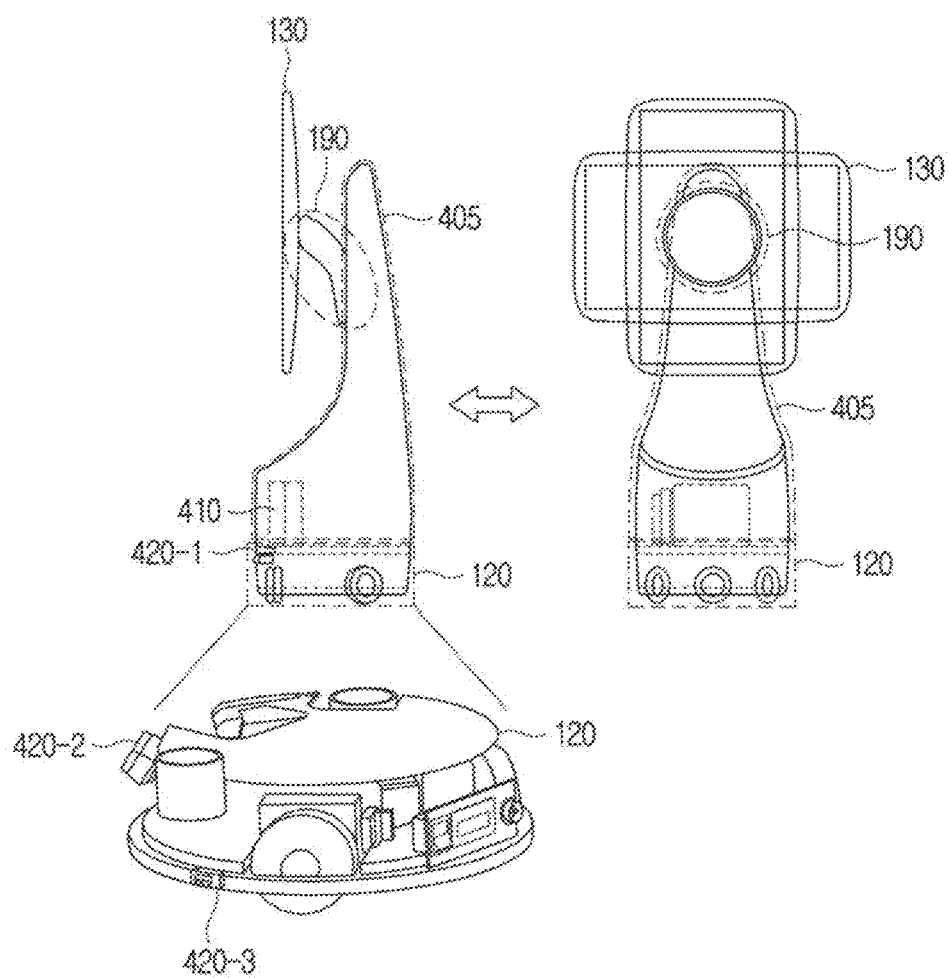
FIG. 4 is a view illustrating structure of an electronic apparatus according to one or more embodiments of the disclosure.

FIG. 4 is a view illustrating structure of the electronic apparatus 100 according to one or more embodiments of the disclosure.

As shown in FIG. 4, the electronic apparatus 100 may include a body 405, the driver 120, the display 130, and the display posture driver 190.

The body 405 may be a structure including the driver 120 disposed on a lower side thereof and supporting the display 130 by the display posture driver 190. The body 405 may include a battery 410 and a light detection and ranging (LiDAR) sensor 420-1. The battery 410 may supply power to the driver 120, and the LiDAR sensor 420-1 may acquire scan data of a surrounding terrain.

The driver 120 may be disposed on the lower side of the body 405, and include a plurality of wheels. The driver 120 may move the position of the electronic apparatus 100 under the control of the processor 140. For example, the driver 120 may include the plurality of wheels, and a control circuit for controlling the plurality of wheels under the control of the processor 140.

The driver 120 may include an RGB-D sensor 420-2 and a time of flight (ToF) sensor 420-3. The RGB-D sensor 420-2 may include an infrared sensor, and estimate its distance to the subject by analyzing an incoming infrared signal after an infrared ray emitted by the infrared sensor is reflected by the subject. In addition, the RGB-D sensor 420-2 may detect a heat source by using the infrared ray because the heat source may be detected in a portion of an infrared region, and all objects of 0K or more emit thermal radiation. That is, the RGB-D sensor 420-2 may acquire an RGB image in the user's visible ray region, a depth image through the infrared ray (IR), and a thermal image through the IR. The ToF sensor 420-3 is the three-dimensional sensor, and may be the sensor recognizing the three-dimensional effect, spatial data, and movement of the object by calculating the distance at which light emitted from the object through the infrared wavelength bounces back in time.

The display posture driver 190 may connect the body 405 with the display 130, and change the posture of the display 130 under the control of the processor 140. For example, the display posture driver 190 may include the first driver for changing the height of the display 130, and the three second drivers for changing the three-axis angle of the display. Here, the first driver may be a component for changing a height of the display posture driver 190 based on the body 405. Alternatively, the display posture driver 190 may include a mounting member for holding the display 130 and a connecting member connecting the mounting member with the body 405, the first driver may be a component for changing a height of the mounting member based on the connecting member, and the three second drivers may be a component for changing a three-axis angle of the mounting member based on the connecting member.

Figure 5:
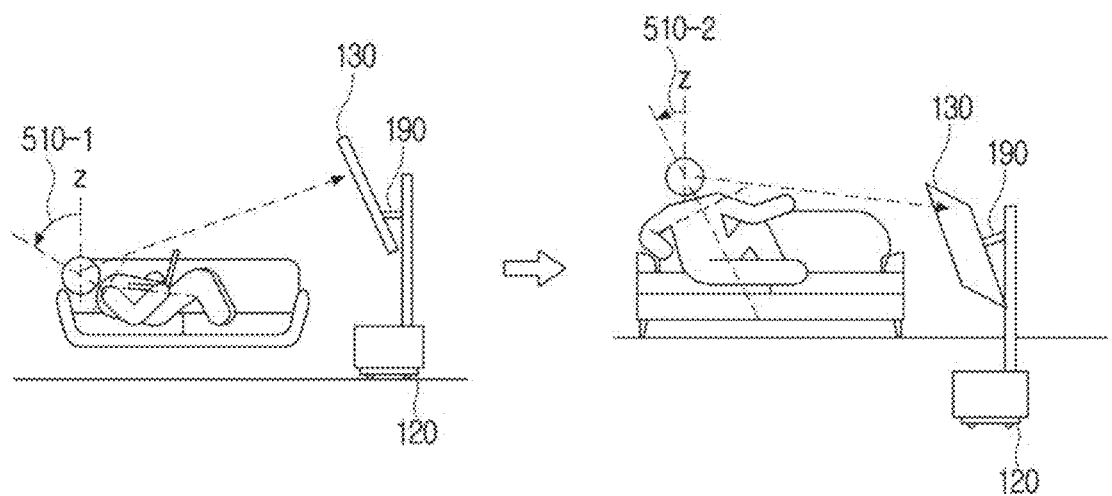
FIG. 5 is a view illustrating operation of the electronic apparatus according to one or more embodiments of the disclosure.

FIG. 5 is a view illustrating operation of the electronic apparatus 100 according to one or more embodiments of the disclosure.

The electronic apparatus 100 may include the display 130 as shown in FIG. 5. However, the disclosure is not limited thereto, and the electronic apparatus 100 may be implemented in a form enabling the electronic apparatus to hold an external display. For example, the electronic apparatus 100 may include the mounting member surrounding the upper, lower, left, right, and outer edges of the external display.

The processor 140 may change the posture of the display 130 based on at least one parameter corresponding to the user posture. For example, as shown on the left side of FIG. 5, the processor 140 may identify the user having the lying posture based on a user body orientation. Alternatively, the processor 140 may identify the user having the lying posture based on the positions of the user's eyes, waist, and knees. Alternatively, the processor 140 may input the image to the first neural network model to identify the user having the lying posture, and identify the user posture by using various methods. If the user has the lying posture, the processor 140 may tilt the display 130 based on the user's eye height.

The processor 140 may change the posture of the display 130 based on a change in the user posture. For example, the user's lying posture as shown on the left side of FIG. 5 may be changed to the user's sitting posture as shown on the right side of FIG. 5. The processor 140 may change the position of the electronic apparatus 100 and the posture of the display 130 based on the user's eye height.

Alternatively, the processor 140 may change the position of the electronic apparatus 100 based on the yaw angle of the user's head/shoulders, and change the height of the display 130 and the pitch angle based on the user's eye height and pitch angle. For example, the user's head may be rotated at a certain angle from a state where the yaw angle of the user's head is 510-1 as shown on the left side of FIG. 5 to a state where the yaw angle of the user's head is 510-2 as shown on the right side of FIG. 5. The processor 140 may control the driver 120 to move the position of the electronic apparatus 100 to be further away from the user. In addition, if the user's eye height is increased from the left side of FIG. 5 to the right side of FIG. 5, the processor 140 may lower the height of the display 130. Here, processor 140 may identify a relative height of the user's eyes from the captured image. For example, the processor 140 may identify the user's eyes from a first image, identify the user's eyes from a second image captured after the first image, and identify that the user's eye position is elevated.

However, the disclosure is not limited thereto, and the processor 140 may change at least one of the position of the electronic apparatus 100 or the posture of the display 130 based on various parameters.

Alternatively, the processor 140 may change at least one of the position of the electronic apparatus 100 or the posture of the display 130 based on an obstacle around the electronic apparatus 100. For example, the processor 140 may change an operation of changing the position of the electronic apparatus 100 to an operation of changing the posture of the display 130 if the obstacle is found while the processor changes the position of the electronic apparatus 100 based on the change in the user posture. For example, the processor 140 may stop the operation of changing the position of the electronic apparatus 100 and increase the height of the display 130 if the processor 140 may no longer approach the user because the obstacle is found while the processor changes the position of the electronic apparatus. Alternatively, the obstacle may be found while the processor 140 changes the position of the electronic apparatus 100 to a first position based on the change in the user posture. The processor 140 may change the position of the electronic apparatus 100 from the first position to a second position, and update the posture of the display 130 based on the changed second position. For example, the processor 140 may further rotate the posture of the display 130 to the right if the processor 140 changes the position of the electronic apparatus 100 from the first position to the second position further to the left.

Figure 6:
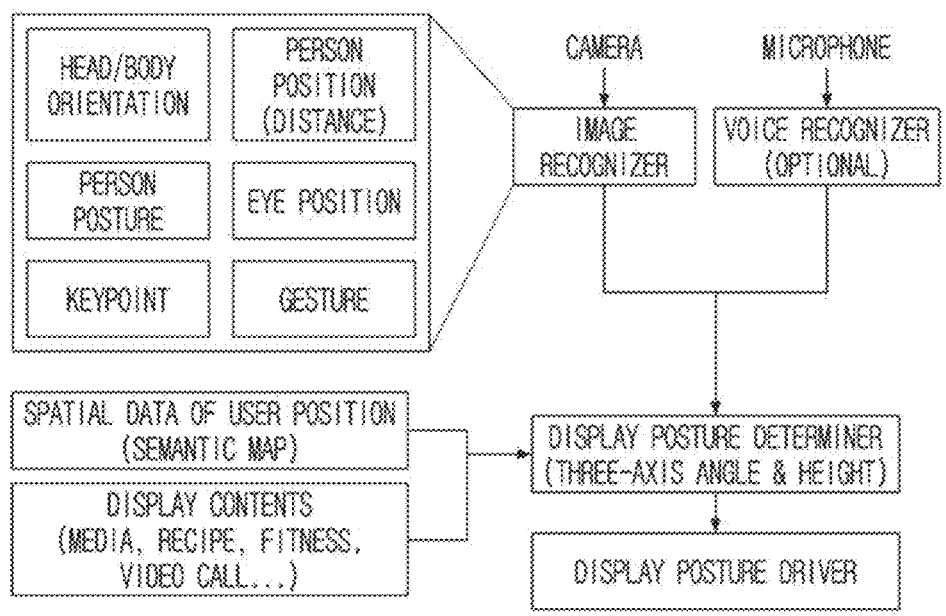
FIG. 6 is a view illustrating data used by a processor and an operation of the processor according to one or more embodiments of the disclosure.

FIG. 6 is a view illustrating data used by the processor 140 and an operation of the processor based thereon according to one or more embodiments of the disclosure. For convenience of description, referring to FIG. 6, the description describes that the processor 140 includes an image recognizer, a voice recognizer, and a display posture determiner. Each of the image recognizer, the voice recognizer, and the display posture determiner may be implemented as software or as one hardware component of the processor 140.

The image recognizer may identify the user's head/body orientation, the user position (distance, or direction, that is, a person position (distance or angle)), the user posture (or a person posture), the eye position, the key point, or the gesture from the captured image by using the camera 110. For example, the image recognizer may identify data about the user step by step, such as identifying the user's head from the captured image by using the camera 110 and identifying the user's eyes within the user's head. In addition, the image recognizer may identify an important point such as the user's eyes, ears, shoulders, elbows, pelvis, knees, or the like as the key point from the captured image. The image recognizer may acquire the data such as the head orientation, the body orientation, the user position, the user posture, the eye height, or the like based on the acquired data. For example, the image recognizer may acquire the user's key point by inputting the captured image to the neural network model. Here, the neural network model may be a model acquired by learning the plurality of sample images and the user's key points included in the plurality of sample images.

However, the disclosure is not limited thereto, and the image recognizer may further acquire data on various users. In addition, the image recognizer may be implemented in the neural network model.

The voice recognizer may identify the user direction based on the user voice received through the microphone 160. In particular, the voice recognizer may identify the user's mouth direction based on the user voice. For example, the microphone 160 may include a first microphone and a second microphone spaced apart from the first microphone by d. An incident angle θ of the user voice received through the first microphone may be θ=arccos ((ψλ)/(2πd)). Here, w is a phase difference, X is a wavelength, and the phase difference and the wavelength may be acquired through two antennas. However, the disclosure is not limited thereto, and various methods for acquiring the user direction may be provided.

However, the voice recognizer may be an additional component. For example, the posture of the display 130 may be determined based only on the data acquired from the image recognizer.

The display posture determiner may determine the posture of the display 130 based on the data received from at least one of the image recognizer or the voice recognizer. For example, the display posture determiner may change at least one of the three-axis angle or the height of the display 130 based on the user posture acquired from the image recognizer.

The display posture determiner may determine the posture of the display 130 based on the data received from the image recognizer and spatial data (or a semantic map) of the user position. For example, the display posture determiner may increase the posture of the display 130 if the user is identified as having the lying posture and lying on a bed rather than if the user is identified as having the lying posture and lying on a floor. That is, the display posture determiner may determine the posture of the display 130 by further considering the spatial data of the user position as well as the user posture. Here, the spatial data of the user position may be acquired through the neural network model. For example, the neural network model outputting the spatial data of the user position may be a model acquired by learning the data on the plurality of sample images and a space where the user is positioned in the plurality of sample images.

The display posture determiner may determine the posture of the display 130 based on the data received from the image recognizer and the content type. For example, if the user has the sitting posture and the content is a general video, the display posture determiner may determine a longer portion of the screen of the display 130 as a posture of the display that is parallel to the ground; and if the user has the sitting posture and the content is a user interface (UI) for a video call, the display posture determiner may determine a shorter portion of the screen of the display 130 as the posture of the display that is parallel to the ground.

In the above, the description exemplifies various factors for determining the posture of the display 130, the disclosure is not limited thereto, and various parameters may be used in a process of determining the posture of the display 130. For example, the display posture determiner may identify illuminance around the electronic apparatus 100, and determine the posture of the display 130 by further considering the illuminance. For example, if the illuminance is lower, the display posture determiner may tilt the display 130 more than if the illuminance is higher, thereby preventing light emitted from the display 130 from being directly incident on the user's eyes.

Alternatively, if the plurality of users are identified, the display posture determiner may identify the user calling the electronic apparatus 100, and identify the posture of the display 130 based on a posture of the user calling the electronic apparatus 100. For example, if a call signal is received from the user terminal device such as a smartphone, the display posture determiner may identify a user of the smartphone among the plurality of users as the user calling the electronic apparatus 100, and identify the posture of the display 130 based on a posture of the user of the smartphone. If the plurality of users are identified and the user calling the electronic apparatus 100 is not identified, the processor 140 may display a UI for inquiring the user calling the electronic apparatus 100, or output a sound for inquiring the user calling the electronic apparatus 100. Alternatively, if the plurality of users are identified, the processor 140 may display a UI for inquiring whether the call of the electronic apparatus 100 is for individual viewing or group viewing, or output a sound for inquiring whether the call of the electronic apparatus 100 is for the individual viewing or the group viewing. If a user command indicating that the call of the electronic apparatus 100 is for the individual viewing is received, the display posture determiner may move the position of the electronic apparatus 100 and change the posture of the display 130 based on a posture of the user providing the user command. If a user command indicating that the call of the electronic apparatus 100 is for the group viewing is received, the display posture determiner may change the position of the electronic apparatus 100 and change the posture of the display 130 based on positions of the plurality of users.

The display posture determiner may change the posture of the display 130 by providing the display posture driver with the data on the posture of the display 130. Here, the data on the posture of the display 130 may include a signal for changing at least one of the height of the display 130 or the three-axis angle of the display 130. For example, the display posture determiner may provide the display posture driver with a control signal for increasing the height of the display 130 by two steps.

Figure 7:
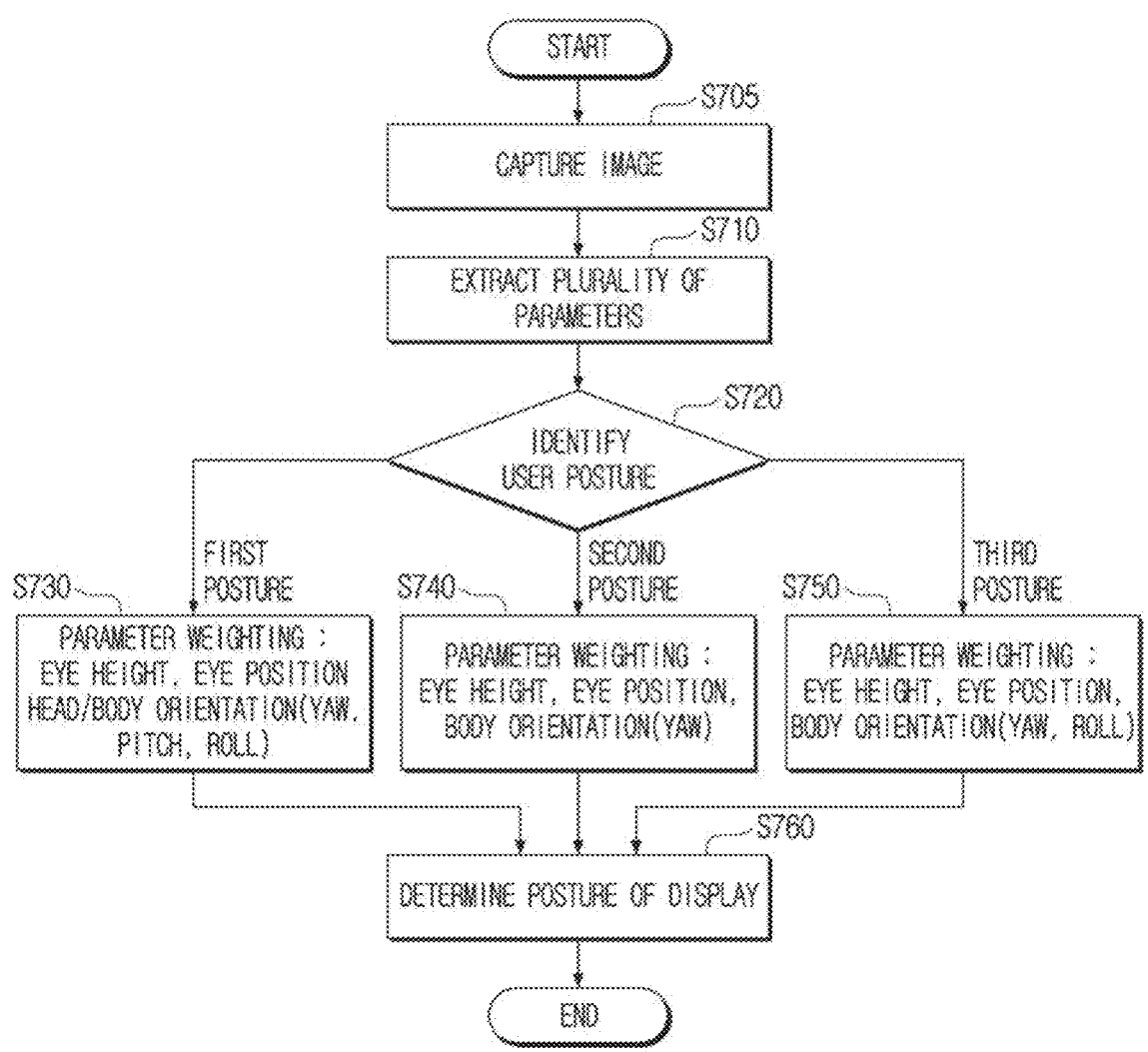
FIG. 7 is a flowchart showing a method of determining a posture of a display according to one or more embodiments of the disclosure.

FIG. 7 is a flowchart showing a method of determining the posture of the display 130 according to one or more embodiments of the disclosure.

First, the processor 140 may capture the image by using the camera 110 (S705). For example, the processor 140 may capture the image by using the camera 110 if the user calls the electronic apparatus 100. The processor 140 may capture the images or the moving images at the predetermined time interval.

The processor 140 may extract the plurality of parameters from the captured image (S710). For example, the processor 140 may identify at least one of the user position, the eye height, the head orientation, the body orientation, or the key point. Alternatively, the processor 140 may extract the parameter through the sensor. For example, the camera 110 may further include the depth camera, and the processor 140 may acquire three-dimensional (3D) data of a subject in front through the depth camera. Each of the plurality of parameters may be expressed as data in a 3D space.

The processor 140 may identify the user posture based on the plurality of parameters (S720). For example, the processor 140 may identify the user posture as one of the sitting posture, the standing posture, and the lying posture based on the plurality of parameters. For example, if the user position is the bed or a sofa, the processor 140 may identify whether the user has the sitting posture or the lying posture based on the user's eye height, head orientation, and body orientation, excluding the standing posture among the user postures. That is, the processor 140 may identify the user posture by using the plurality of parameters step by step. However, the disclosure is not limited thereto, and the user posture may be further subdivided.

Alternatively, the processor 140 may identify the user posture based on a change in the eye height, a change in the head orientation, a change in the body orientation, or at least one of these changes among the plurality of parameters. The processor 140 may control the camera 110 to capture the plurality of images and identify the changes in the plurality of parameters related to the user from the plurality of images.

Alternatively, the processor 140 may assign a score to each of the plurality of postures based on each of the plurality of parameters, and finally identify a posture having the highest score as the user posture. For example, the processor 140 may assign 1 point to each of the sitting posture and the lying posture if the user position is the bed or the sofa, and the processor 140 may assign 1 point to each of the sitting posture and the standing posture if the user's eye height is 1 m or more from the ground. The processor 140 may assign a score to each of the plurality of postures based on each of the plurality of parameters in this way, and then identify the user posture.

Alternatively, the processor 140 may identify the user posture through the neural network model. For example, the neural network model may be a model acquired by learning a relationship between the plurality of parameters related to the user and the user posture, and the processor 140 may input the plurality of parameters to the neural network model to identify the user posture.

The processor 140 may determine the posture of the display 130 based on at least one first parameter among the plurality of parameters if the user is identified as having the first posture (S760). For example, if the user is identified as having the sitting posture, the processor 140 may determine the posture of the display 130 (S760) based on the yaw angle, the pitch angle, and the roll angle representing the eye height, the user position, and the head/body orientation among the plurality of parameters (S730). For example, in the case of the sitting posture, the user body may be fixed on a chair while the user's head may be freely moved, and the processor 140 may thus determine the posture of the display 130 by considering both the head orientation and the body orientation.

Alternatively, the processor 140 may determine the posture of the display 130 based on at least one second parameter among the plurality of parameters if the user is identified as having the second posture (S760). For example, if the user is identified as having the standing posture, the processor 140 may determine the posture of the display 130 (S760) based on the yaw angle representing the eye height, the user position, or the body orientation among the plurality of parameters (S740). For example, in the case of the standing posture, the user body may be freely moved. Accordingly, under the premise that the most natural posture is acquired, the processor 140 may determine the posture of the display 130 by considering only the yaw angle representing the body orientation.

Alternatively, the processor 140 may determine the posture of the display 130 based on at least one third parameter among the plurality of parameters if the user is identified as having a third posture (S760). For example, if the user is identified as having the lying posture, the processor 140 may determine the posture of the display 130 (S760) based on the yaw angle and the roll angle representing the eye height, the user position, and the body orientation among the plurality of parameters (S750). For example, in the case of the lying posture, the user's head cannot be freely moved. Accordingly, the processor 140 may determine the posture of the display 130 by considering the yaw angle and the roll angle representing the body orientation.

That is, a parameter used for identifying the user posture and a parameter used for determining the posture of the display 130 after the user posture is identified may be different from each other.

However, the disclosure is not limited thereto, and various methods of determining the user posture and the posture of the display 130 may be provided. For example, the electronic apparatus 100 may include the plurality of microphones, and the processor 140 may identify the user's mouth direction through the plurality of microphones. For example, if the user voice calling the electronic apparatus 100 is received through the plurality of microphones, the processor 140 may identify the user's mouth direction through the plurality of microphones, identify the user posture as one of the sitting posture, the standing posture, and the lying posture based on the user's mouth direction, change the position of the electronic apparatus 100 based on the user position, and change the posture of the display 130 based on the identified user posture.

Figure 8:
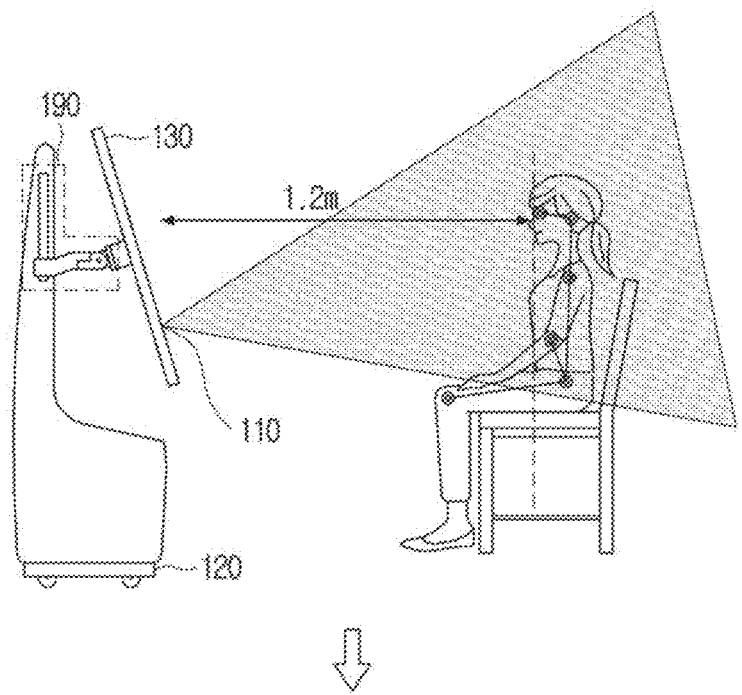
FIG. 8 is a view illustrating a method of determining a position of the electronic apparatus according to a user posture according to one or more embodiments of the disclosure.
Figure 8:
Figure 8:
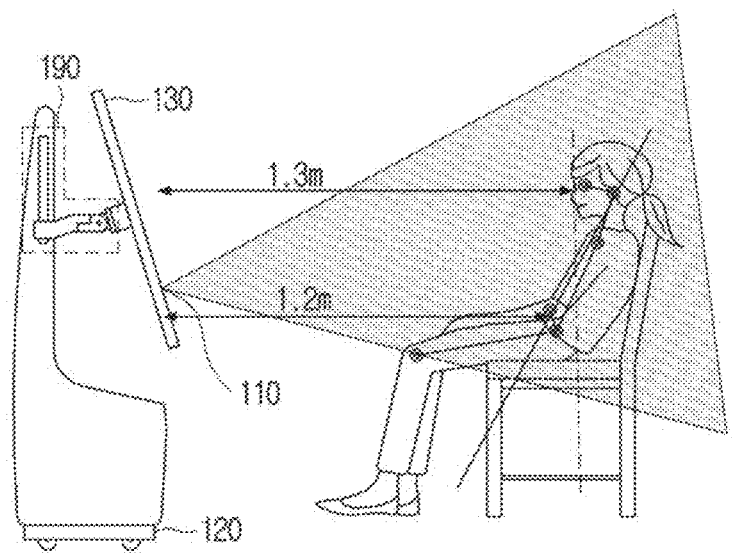

FIG. 8 is a view illustrating a method of determining the position of the electronic apparatus 100 according to a user posture according to one or more embodiments of the disclosure.

The processor 140 may then change the position of the electronic apparatus 100 based on the user posture. For example, the processor 140 may change the position of the electronic apparatus 100 to separate the electronic apparatus 100 by a reference distance from the user. Here, the reference distance may be constant regardless of the user posture. To this end, the processor 140 may correct a distance between the user's head and the electronic apparatus 100 based on tilt of the user's upper body. For example, as shown in the upper side of FIG. 8, the user's upper body may not be inclined. The processor 140 may change the position of the electronic apparatus 100 based on the user's head to maintain the distance between the user's head and the electronic apparatus 100 at the predetermined reference distance. Alternatively, as shown in the lower side of FIG. 8, the user's upper body may be inclined. The processor 140 may correct the distance between the user's head and the electronic apparatus 100 based on the tilt of the user's upper body.

However, the disclosure is not limited thereto, and the processor 140 may change the position of the electronic apparatus 100 based on a point other than the user's head.

Alternatively, the processor 140 may change the position of the electronic apparatus 100 based on the user's eye position without considering the tilt of the user's upper body. The electronic apparatus 100 may be spaced apart from the user's eyes at the predetermined distance.

The camera 110 may be disposed on one side of the display 130, and the processor 140 may change the display 130 for the user or the predetermined user body part to be included within the predetermined region in the captured image. For example, referring to FIG. 8, the camera 110 may be disposed to capture a direction in which light is emitted from the display 130, and a portion represented by a triangular shade may represent a field of view (FoV) of the camera 110. The processor 140 may change the posture of the display 130 based on the user posture for the user's head to be positioned within the FoV even if the posture of the display 130 is changed. That is, a change in the posture of the display 130 may have a limitation that the user's head is required to be positioned within the FoV.

Figure 9:
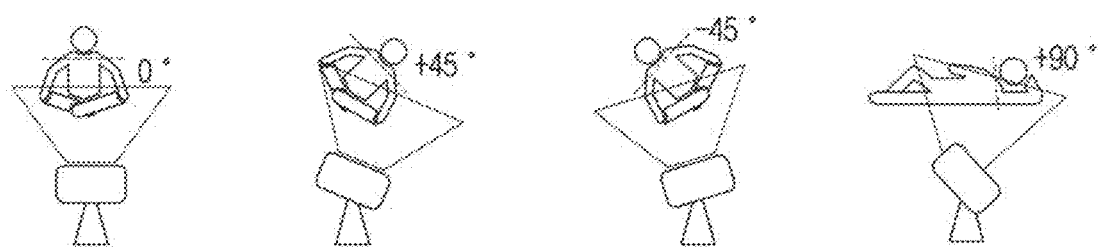
FIG. 9 is a view illustrating a roll angle control of the display according to one or more embodiments of the disclosure.

FIG. 9 is a view illustrating a roll angle control of the display 130 according to one or more embodiments of the disclosure.

The processor 140 may control the roll angle of the display 130 based on the user's head orientation. For example, FIG. 9 shows each roll angle of the display 130 if a line connecting the user's two eyes with each other in a horizontal direction has zero degrees, 45 degrees, −45 degrees, and 90 degrees.

The processor 140 may identify the user's head orientation based on the user's two eyes. If the user's head orientation is changed, the processor 140 may change the roll angle of the display 130 based on the changed user's head orientation. The processor 140 may capture the front of the electronic apparatus 100 by using the camera 110 at the predetermined time interval, and identify a change in the user's head orientation from the captured images at the predetermined time interval.

Alternatively, if the user's head orientation is changed and the predetermined time elapses, the processor 140 may change the roll angle of the display 130 based on the changed user's head orientation. For example, if the user's head orientation is changed and 10 seconds elapses, the processor 140 may change the roll angle of the display 130 based on the changed user's head orientation. If the roll angle of the display 130 is continuously changed without delay based on the user's head orientation, the user's viewing may be disturbed, which may be solved by a predetermined time condition.

Alternatively, if the change in the user's head orientation is greater than or equal to a predetermined amount, the processor 140 may change the roll angle of the display 130 based on the changed user's head orientation. It is impossible for the user's head to be never moved, and the roll angle of the display 130 may be changed due to a minute movement unrelated to the user's intention. Here, the user's viewing may be disturbed, which may be solved by the condition that the change in the user's head orientation is greater than or equal to the predetermined amount.

Alternatively, if the change in the user's head orientation is greater than or equal to the predetermined amount, and the predetermined time elapses, the processor 140 may change the roll angle of the display 130 based on the changed user's head orientation.

Figure 10:
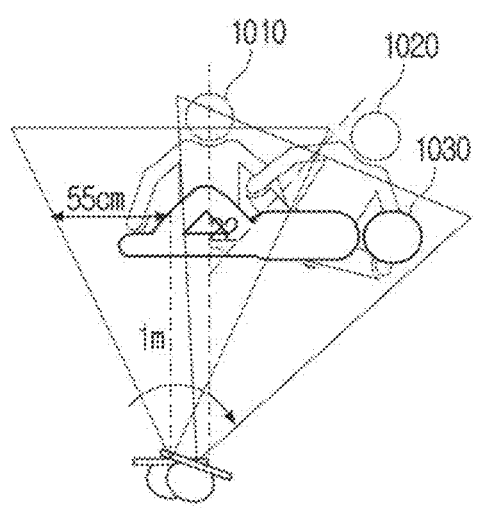
FIGS. 10 and 11 are views illustrating a prediction operation according to one or more embodiments of the disclosure.
Figure 11:
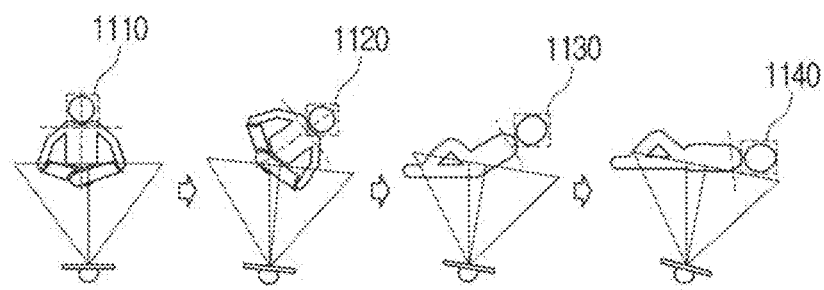

FIGS. 10 and 11 are views illustrating a prediction operation according to one or more embodiments of the disclosure.

The processor 140 may change the posture of the display 130 based on the user posture. For example, as shown in FIG. 10, if the user posture is changed from a 1010 posture to a 1030 posture through a 1020 posture, the processor 140 may change the posture of the display 130 to correspond to each posture.

Here, the display posture driver 190 changing the posture of the display 130 may include at least one motor, and delay may occur due to a mechanical operation thereof. In addition, the delay may occur also in an operation of the processor 140 identifying the posture of the display 130 as being changed based on the change in the user posture. As a result, as the delay occurs due to the change in the user posture, the change in the posture of the display 130 in response to the change in the user posture may be delayed.

However, even though a certain amount of delay is required for the change in the posture of the display 130 to reflect the user's intention, the change in the user posture may be reflected in advance if this change has a certain regularity.

To this end, the processor 140 may acquire the plurality of images by capturing the images by the camera 110 at the predetermined time interval, acquire the predicted user posture at the predetermined time point from the current time point based on the plurality of images, and change the posture of the display 130 based on the user posture and the predicted user posture.

For example, as shown in FIG. 11, in case of the user posture is changed from a 1110 posture to a 1140 posture through a 1120 posture and a 1130 posture, the processor 140 may predict the change to the 1140 posture at a specific time point in a process of the change from the 1110 posture to the 1140 posture, for example, at a time point of the 1130 posture. Accordingly, the processor 140 may change the yaw angle of the display 130 based on the 1140 posture even at the time point of the 1130 posture.

Figure 12:
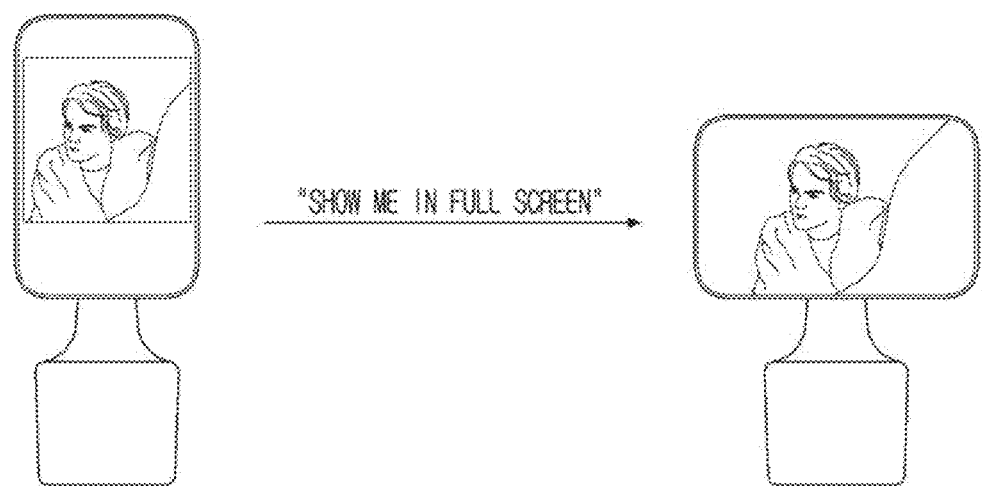
FIGS. 12 and 13 are views illustrating an operation based on a content type according to one or more embodiments of the disclosure.
Figure 13:
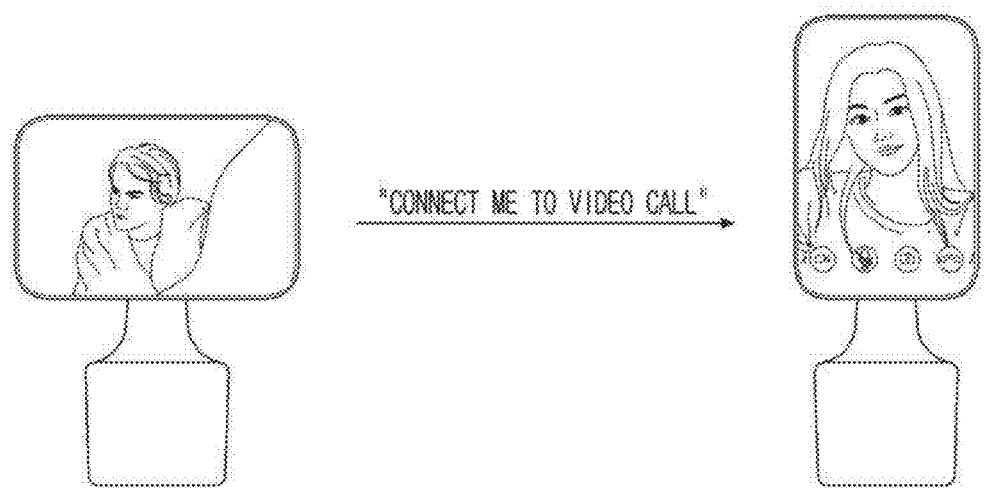

FIGS. 12 and 13 are views illustrating an operation based on the content type according to one or more embodiments of the disclosure.

The processor 140 may change the posture of the display 130 based on the user command. For example, the user may input a user command "Show me in full screen" while viewing the content in the posture of the display 130 as shown on the left side of FIG. 12. The processor 140 may change the posture of the display 130 as shown on the right side of FIG. 12. The processor 140 may store data on the content type or an application providing the content, at a time point at which the user command is input, in the memory 170. Then, the same content as the content type stored in the memory 170 or the content provided by the application stored in the memory 170 may be played on the display 130 in its posture as shown on the left side of FIG. 12. The processor 140 may automatically change the posture of the display 130 as shown on the right side of FIG. 12.

Alternatively, if a user command such as "Connect me to the video call" is received while the user views the content as shown on the left side of FIG. 13, the processor 140 may change the posture of the display 130 as shown on the right side of FIG. 13.

Figure 14:
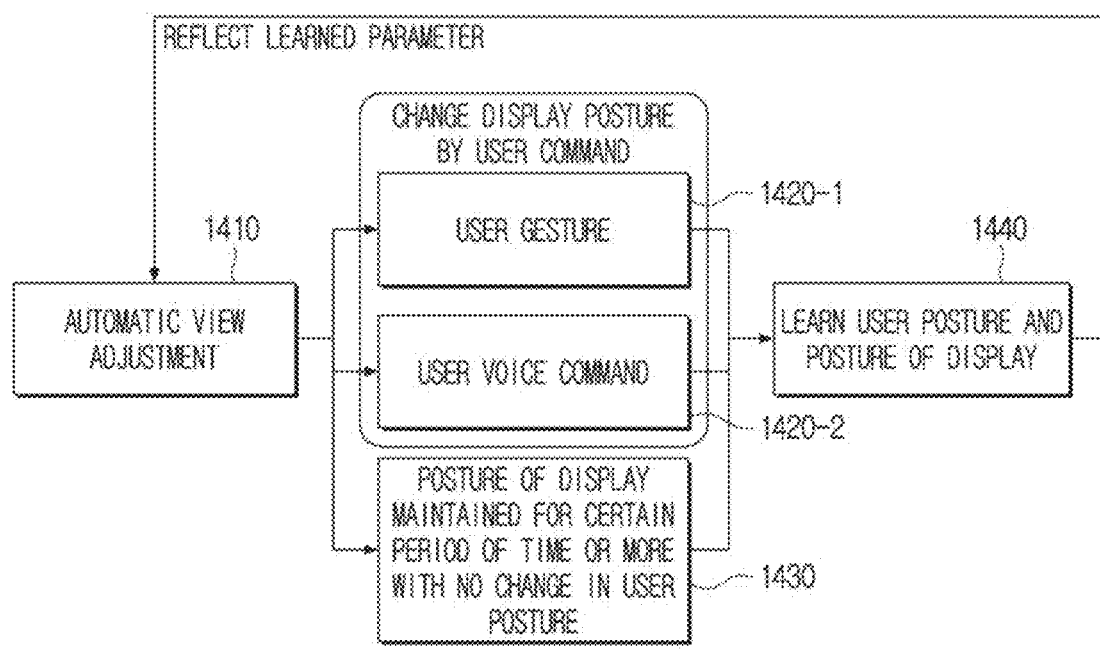
FIG. 14 is a view illustrating an adaptive operation to a user according to one or more embodiments of the disclosure.

FIG. 14 is a view illustrating an adaptive operation to the user according to one or more embodiments of the disclosure.

The processor 140 may change the posture of the display 130 based on the user posture (or may perform automatic view adjustment 1410).

The processor 140 may then change the posture of the display 130 based on at least one of a user gesture 1420-1 or a user voice command 1420-2. The processor 140 may learn at least one of the user gesture 1420-1 or the user voice command 1420-2 and the changed posture of the display 130 (1440), and then use the same for the automatic view adjustment operation.

Alternatively, if the posture of the display 130 is maintained for a certain period of time or more with no change in the user posture (1430), the processor 140 may learn the user posture and the posture of the display 130 (1440), and then use the same for the automatic view adjustment operation.

FIG. 15 is a flowchart illustrating a control method of an electronic apparatus according to one or more embodiments of the disclosure.

First, the method may include capturing an image (S1510). In addition, the method may include identifying a user posture included in the captured image (S1520). In addition, the method may include identifying at least one parameter among the plurality of parameters related to a user based on the user posture (S1530). In addition, the method may include changing a position of the electronic apparatus based on the at least one parameter, and changing a posture of a display included in the electronic apparatus (S1540).

In addition, the method may further include moving toward the user based on a user command or a user voice if the user command calling the electronic apparatus is received from another electronic apparatus or the user voice calling the electronic apparatus is received through a microphone included in the electronic apparatus, wherein in the capturing, a plurality of images may be acquired by turning on a camera included in the electronic apparatus to capture the images at a predetermined time interval.

In addition, in the changing of the posture of the display (S1540), the user posture and a distance of the display to the user may be identified based on the plurality of images, and the change in the position of the electronic apparatus may be stopped if the distance to the user is a distance corresponding to the user posture.

In addition, in the identifying of the user posture (S1520), the plurality of parameters related to the user may be identified based on the captured image, and the user posture may be identified based on the plurality of parameters; and in the changing of the posture of the display (S1540), the posture of the display may be changed based on at least one first parameter among the plurality of parameters if the user posture is a first posture, and the posture of the display may be changed based on at least one second parameter among the plurality of parameters if the user posture is a second posture.

In addition, the method may further include displaying a content, and in the changing of the posture of the display (S1540), the posture of the display may be changed based on a content type and the user posture.

In addition, in the changing of the posture of the display (S1540), the posture of the display may be changed based on a changed user posture if the user posture is changed and predetermined time elapses.

In addition, in the capturing of the image (S1510), the plurality of images may be acquired by capturing the images at the predetermined time interval, in the identifying of the user posture (S1520), a predicted user posture may be acquired at a predetermined time point from a current time point based on the plurality of images, and in the changing of the posture of the display (S1540), the posture of the display may be changed based on the user posture and the predicted user posture.

In addition, in the identifying of the user posture (S1520), the user posture may be identified by inputting the captured image to a first neural network model.

In addition, in the changing of the posture of the display (S1540), data on the posture of the display may be acquired by inputting the plurality of parameters to a second neural network model, and the posture of the display may be changed based on the data on the posture of the display.

In addition, the method may further include changing the posture of the display based on the user command if the user command to change the posture of the display is received, and updating the second neural network model based on the plurality of parameters and the changed posture of the display.

In addition, in the capturing of the image (S1510), the plurality of images may be acquired by capturing the images at the predetermined time interval, and in the changing of the posture of the display (S1540), the posture of the display may be changed based on a user gesture or the user voice if the predetermined user gesture is identified from the plurality of images or the user voice to change the posture of the display is received.

In addition, the camera included in the electronic apparatus may be disposed on one side of the display, and in the changing of the posture of the display (S1540), the posture of the display may be changed for the user or a predetermined user body to be included within a predetermined region in the captured image.

According to the various embodiments of the disclosure as described above, the electronic apparatus may improve the user convenience by providing the screen with a posture optimized for the user.

In addition, the electronic apparatus may perform an adaptive operation to the user by learning the user posture and the posture of the display.

According to one or more embodiments of the disclosure, the various embodiments described above may be implemented in software including an instruction stored in a machine-readable storage medium (for example, a computer-readable storage medium). A machine may be a device that invokes the stored instruction from the storage medium and is operated based on the invoked instruction, and may include the electronic apparatus (for example, an electronic apparatus A) in the disclosed embodiments. If the instruction is executed by the processor, the processor may directly perform a function corresponding to the instruction or other components may perform the function corresponding to the instruction under control of the processor. The instruction may include codes provided or executed by a compiler or an interpreter. The machine-readable storage medium may be provided in the form of a non-transitory storage medium. Here, the term "non-transitory" indicates that the storage medium is tangible without including a signal, and does not distinguish whether data are semi-permanently or temporarily stored in the storage medium.

In addition, according to one or more embodiments of the disclosure, the method according to the various embodiments described above may be provided by being included in a computer program product. The computer program product may be traded as a product between a seller and a purchaser. The computer program product may be distributed in a form of the machine-readable storage medium (for example, a compact disc read only memory (CD-ROM)) or online through an application store (for example, PlayStore™). In case of the online distribution, at least a part of the computer program product may be at least temporarily stored or temporarily provided in a storage medium such as a memory of a server of a manufacturer, a server of an application store or a relay server.

In addition, according to one or more embodiments of the disclosure, the various embodiments described above may be implemented in a computer or a computer-readable recording medium using software, hardware, or a combination of software and hardware. In some cases, one or more embodiments described in the disclosure may be implemented by the processor itself. According to a software implementation, one or more embodiments such as procedures and functions described in the disclosure may be implemented by separate software modules. Each of the software modules may perform one or more functions and operations described in the disclosure.

Computer instructions for performing processing operations of the machine according to the various embodiments described above may be stored in a non-transitory computer-readable medium. The computer instructions stored in the non-transitory computer-readable medium allow a specific machine to perform the processing operations in the machine according to the various embodiments described above if the instructions are executed by a processor of the specific machine. The non-transitory computer-readable medium is not a medium that stores data therein for a while, such as a register, a cache, or a memory, and indicates a medium that semi-permanently stores data therein and is readable by the machine. A specific example of the non-transitory computer-readable medium may include a compact disk (CD), a digital versatile disk (DVD), a hard disk, a Blu-ray disk, a universal serial bus (USB), a memory card, a read-only memory (ROM), or the like.

In addition, each of the components (for example, modules or programs) according to the various embodiments described above may include a single entity or a plurality of entities, and some of the corresponding sub-components described above may be omitted or other sub-components may be further included in the various embodiments. Alternatively or additionally, some of the components (for example, the modules or the programs) may be integrated into one entity, and may perform functions performed by the respective corresponding components before being integrated in the same or similar manner. Operations performed by the modules, the programs or other components according to the various embodiments may be executed in a sequential manner, a parallel manner, an iterative manner or a heuristic manner, and at least some of the operations may be performed in a different order or be omitted, or other operations may be added.

In addition, although the embodiments are shown and described in the disclosure as above, the disclosure is not limited to the above mentioned embodiments, and may be variously modified by those skilled in the art to which the disclosure pertains without departing from the gist of the disclosure as disclosed in the accompanying claims. These modifications should also be understood to fall within the scope and spirit of the disclosure.

What is claimed is:

1. An electronic apparatus comprising:
a camera;
a driver;
a display; and
at least one processor operatively connected to the camera, the driver, and the display, and configured to:
control the camera to capture an image,
identify a plurality of parameters related to a user based on the captured image,
identify a user posture based on the plurality of parameters,
select at least one parameter among the plurality of parameters based on the user posture,
control the driver to change a position of the electronic apparatus and change a posture of the display based on the at least one parameter,
change the at least one parameter used to change the position of the electronic apparatus,
control the display to display a content, and
change the posture of the display based on a content type of the content changing and the user posture remaining unchanged,
wherein the content type comprises at least one of a general video, a user interface, a sports broadcast, or a game broadcast.

2. The electronic apparatus as claimed in claim 1, further comprising:
a communication interface; and
a microphone,
wherein the at least one processor is further configured to:
control the driver to move the electronic apparatus toward the user based on a user command being received from another electronic apparatus through the communication interface or the user command being received through the microphone, and
control the camera to capture a plurality of images at a predetermined time interval.

3. The electronic apparatus as claimed in claim 2, wherein the at least one processor is further configured to:
identify the user posture and a distance from the electronic apparatus to the user based on the plurality of images, and
stop an operation of the driver based on the distance from the electronic apparatus to the user corresponding to the user posture.

4. The electronic apparatus as claimed in claim 1, wherein the at least one processor is further configured to:
based on the user posture being a first posture, change the posture of the display based on at least one first parameter among the plurality of parameters, and
based on the user posture being a second posture, change the posture of the display based on at least one second parameter among the plurality of parameters.

5. The electronic apparatus as claimed in claim 1, wherein the content type comprises at least one of the sports broadcast or the game broadcast.

6. The electronic apparatus as claimed in claim 1, wherein the at least one processor is further configured to, based on the user posture being changed and a predetermined time elapsing, change the posture of the display based on the changed user posture.

7. The electronic apparatus as claimed in claim 1, wherein the at least one processor is further configured to:
control the camera to capture a plurality of images at a predetermined time interval,
acquire a predicted user posture at a predetermined time point from a current time point based on the plurality of images, and
change the posture of the display based on the user posture and the predicted user posture.

8. The electronic apparatus as claimed in claim 1, further comprising a memory configured to store a first neural network model,
wherein the at least one processor is further configured to identify the user posture by inputting the captured image to the first neural network model.

9. The electronic apparatus as claimed in claim 1, further comprising a memory configured to store a second neural network model,
wherein the at least one processor is further configured to:
acquire data on the posture of the display by inputting the plurality of parameters to the second neural network model, and
change the posture of the display based on the data on the posture of the display.

10. The electronic apparatus as claimed in claim 9, further comprising the user interface,
wherein the at least one processor is further configured to:
based on a user command to change the posture of the display being received through the user interface, change the posture of the display based on the user command, and
update the second neural network model based on the plurality of parameters and the changed posture of the display.

11. The electronic apparatus as claimed in claim 1, further comprising a microphone,
wherein the at least one processor is further configured to:
control the camera to capture a plurality of images at a predetermined time interval, and
change the posture of the display based on a user gesture identified from the plurality of images, or based on a user voice to change the posture of the display received through the microphone.

12. The electronic apparatus as claimed in claim 1, wherein the camera is provided on one side of the display, and
wherein the at least one processor is further configured to change the posture of the display for the user or for a predetermined user body part included within a predetermined region in the captured image.

13. The electronic apparatus as claimed in claim 1, further comprising a display posture driver,
wherein the at least one processor is further configured to control the display posture driver to change the posture of the display.

14. The electronic apparatus as claimed in claim 1, wherein the at least one processor is further configured to control the driver to change the position of the electronic apparatus based on movement of the user posture.

15. A control method of an electronic apparatus, the control method comprising:
capturing an image;
identifying a plurality of parameters related to a user based on the captured image,
identifying a user posture based on the plurality of parameters;
selecting at least one parameter among the plurality of parameters based on the user posture;
changing a position of the electronic apparatus and changing a posture of a display included in the electronic apparatus based on the at least one parameter;
changing the at least one parameter used to change the position of the electronic apparatus;
controlling the display to display a content; and
changing the posture of the display based on a content type of the content changing and the user posture remaining unchanged,
wherein the content type comprises at least one of a general video, a user interface, a sports broadcast, or a game broadcast.

16. An electronic apparatus comprising:
a memory configured to store instructions;
at least one processor configured to:
obtain an image captured by a camera;
identify a plurality of parameters related to a user based on the captured image,
identify a user posture based on the plurality of parameters,
select at least one parameter among the plurality of parameters based on the user posture,
control the electronic apparatus to change a position of the electronic apparatus and change a posture of a display based on the at least one parameter,
change the at least one parameter used to change the position of the electronic apparatus,
control the display to display a content, and
change the posture of the display based on a content type of the content changing and the user posture remaining unchanged,
wherein the content type comprises at least one of a general video, a user interface, a sports broadcast, or a game broadcast.

17. The electronic apparatus as claimed in claim 16, wherein the at least one processor is further configured to:
control to move the electronic apparatus toward the user based on a user command being received; and
control to capture a plurality of images at a predetermined time interval.

18. The electronic apparatus as claimed in claim 17, wherein the at least one processor is further configured to:
identify the user posture and a distance from the electronic apparatus to the user based on the plurality of images, and
stop an operation of the electronic apparatus based on the distance from the electronic apparatus to the user corresponding to the user posture.

19. The electronic apparatus as claimed in claim 16, wherein the at least one processor is further configured to:
based on the user posture being a first posture, change the posture of the display based on at least one first parameter among the plurality of parameters, and
based on the user posture being a second posture, change the posture of the display based on at least one second parameter among the plurality of parameters.

20. The electronic apparatus as claimed in claim 16, wherein the content type comprises at least one of the sports broadcast or the game broadcast.

* * * * *